(12) United States Patent
Barroso et al.

(10) Patent No.: US 12,228,210 B2
(45) Date of Patent: Feb. 18, 2025

(54) TRACEABLE GASKET AND COMPRESSION PACKING MATERIAL

(71) Applicant: TEADIT N.A., INC., Pasadena, TX (US)

(72) Inventors: Carlos Daniel Braga Girao Barroso, Rio de Janeiro (BR); Christopher Louis Day, Kemah, TX (US); Jose Carlos Carvalho Veiga, Rio de Janeiro (BR); Josmar Baruffaldi Cristello, Rio de Janeiro (BR); Robert Adam Riggs, Chesterfield, VA (US); André Carlos de Azevedo Valle, Rio de Janeiro (BR)

(73) Assignee: TEADIT N.A., INC., Pasadena, TX (US)

( * ) Notice: Subject to any disclaimer, the term of this patent is extended or adjusted under 35 U.S.C. 154(b) by 88 days.

(21) Appl. No.: 18/158,588

(22) Filed: Jan. 24, 2023

(65) Prior Publication Data

US 2023/0160471 A1    May 25, 2023

Related U.S. Application Data

(63) Continuation of application No. PCT/US2021/071021, filed on Jul. 27, 2021, which is
(Continued)

(51) Int. Cl.
*F16J 15/10* (2006.01)
*D02G 3/32* (2006.01)
(Continued)

(52) U.S. Cl.
CPC ............. *F16J 15/104* (2013.01); *D02G 3/32* (2013.01); *D02G 3/36* (2013.01); *D02G 3/38* (2013.01);
(Continued)

(58) Field of Classification Search
CPC ........ F16J 15/104; F16J 15/102; F16J 15/121; F16J 15/22; F16J 15/064; D02G 3/32;
(Continued)

(56) References Cited

U.S. PATENT DOCUMENTS 5,472,031 A   12/1995   Austin
5,492,336 A   2/1996    Barna et al.
(Continued)

FOREIGN PATENT DOCUMENTS

CN        106009432 A      10/2016
WO     WO 2008/125539 A1   10/2008

OTHER PUBLICATIONS

Elliott MacKay, J. (2004), in "Detection Of Fugitive Emissions From Valve Stems —DC Resistance Response And Gas Adsorption Over Tin Dioxide Mixed With Alumina", University of British Columbia. (225 pages).
(Continued)

*Primary Examiner* — James C Yager
(74) *Attorney, Agent, or Firm* — Haynes and Boone, LLP; Randall C. Brown; Vera Suarez

(57) ABSTRACT

A material that includes traceable particles that retain information about the fabrication of the material, which can be used to trace the origin thereof. The material may form gaskets, which are used to seal flanged joints in the food and beverage industry, and compression packings, which are used for sealing near valve stems, pump shafts, and similar machines.

16 Claims, 16 Drawing Sheets

Related U.S. Application Data a continuation of application No. 16/939,786, filed on Jul. 27, 2020, now Pat. No. 10,989,304.

(51) Int. Cl.

| | |
|---|---|
| *D02G 3/36* | (2006.01) |
| *D02G 3/38* | (2006.01) |
| *D02G 3/44* | (2006.01) |
| *F16J 15/12* | (2006.01) |
| *F16J 15/22* | (2006.01) |

(52) U.S. Cl.
CPC ............ *D02G 3/447* (2013.01); *F16J 15/102* (2013.01); *F16J 15/121* (2013.01); *F16J 15/22* (2013.01); *D10B 2101/12* (2013.01); *Y10T 428/1352* (2015.01)

(58) Field of Classification Search
CPC . D02G 3/36; D02G 3/38; D02G 3/447; D10B 2101/12; C08K 3/16; C08K 3/30; C08K 5/357; C08K 7/26; C08K 3/08; C08K 3/013; C08K 5/0041; C09K 3/1009; D01F 1/04; D01F 1/06; D01F 1/10; D01F 6/12; Y10T 428/1352; C08L 27/18
See application file for complete search history.

(56) References Cited

U.S. PATENT DOCUMENTS

| | | | |
|---|---|---|---|
| 6,531,217 | B1 | 3/2003 | Martin et al. |
| 9,701,058 | B2 | 7/2017 | Valle et al. |
| 10,989,304 | B1 | 4/2021 | Barroso et al. |
| 2013/0307229 | A1 | 11/2013 | Veiga et al. |
| 2015/0082757 | A1 | 3/2015 | Chaen et al. |

OTHER PUBLICATIONS

Paeffgen N. (2014), Elise, in "EPA To Review Consent Decrees To Ensure Compliance", Alston & Bird LLP, as of 2011. (2 pages).

International Search Report and Written Opinion of the International Search Authority issued by the U.S. Patent and Trademark Office for International Application No. PCT/US2021/071021 dated Dec. 28, 2021. (15 pages).

Diaz et al. "Fluorescent labeling and tracking of nanoclay" Nanoscale. vol. 5 (Nov. 8, 2012): pp. 164-168; entire document, but especially: abstract, p. 165 col 1 para 2. (5 pages).

TRACEABLE GASKET AND COMPRESSION PACKING MATERIAL

CROSS-REFERENCE TO RELATED APPLICATION

This application is a continuation of International Patent Application No. PCT/US2021/071021, filed Jul. 27, 2021, which claims the benefit of the filing date of, and priority to, U.S. application Ser. No. 16/939,786, filed Jul. 27, 2020 and now issued as U.S. Pat. No. 10,989,304, the entire disclosures of which are hereby incorporated herein by reference.

TECHNICAL FIELD

The present disclosure relates to a sealing element, such as a gasket for sealing flanged joints and a compression packing for sealing near valve stems, pump shafts, and similar machine elements.

BACKGROUND

A sealing element may be a static seal, such as a gasket, or a dynamic seal, such as a compression packing. Generally, gaskets fit between flat surfaces whereas a compression packing is positioned near valve stems, pump shafts, and similar machine elements.

Regarding gaskets, gasket materials are widely applied to seal flanged joints in a large variety of industrial applications. They are designed to fill the space between two or more mating surfaces on machine parts to prevent any leakage from or into them. While being used, they can withstand extreme conditions of loading, temperature, and pressure.

One of the most used gasket materials is polytetrafluoroethylene ("PTFE") polymer. It is well known to provide a good trade-off between chemical and mechanical properties. Some of the advantages offered are good performance at low and high temperatures, low coefficient of friction, excellent electrical insulation, and good ability to resist chemical attack. Furthermore, it can be easily combined with other substances, such as filler and additives to enhance some features.

However, the use of gasket materials in some industries, for example, the food and beverage industry, is not so straightforward. In such an application, these materials may be submitted to different conditions of temperature and pressure, they may suffer chemical attacks, and they may deteriorate over time. Or, even worse, they may contaminate the process stream. Therefore, the gasket materials must be carefully chosen, as this industry requires a comprehensive safety strategy to avoid contamination.

Accordingly, the gasket materials must fulfill the requirements of many standards and regulatory guidelines. In the U.S., for instance, the Food and Drug Administration ("FDA") and the National Sanitation Foundation ("NSF") play an important role in controlling the safety and quality of consumer products. Both organizations provide strict standards and testing to approve materials that come in contact with food or beverages during processing, packaging, or even storage.

Two common standards used to test, for example, PTFE gasket materials are FDA 21 CFR 177.1550 "Perfluorocarbon resins" and NSF/ANSI 51-2019 "Food equipment materials". Testing on these standards certifies and assures that the contaminants from the gasket material are below the maximum allowable limits.

In addition to compliance with guidelines, it is desirable that the gasket materials have the means to indicate they are contaminating the process stream if they degrade somehow, requiring removal. That is why the process stream features some tools, such as metal detectors and visual inspections, to track product purity along the process stream and identify foreign bodies from broken machinery or processing equipment components.

The traceability of foreign bodies along the process stream ensures safety and quality and avoids contamination in food and drink products. It plays a key role as contamination accidents usually result in production line stoppages, wasting vast amounts of time and money. Therefore, machine parts and objects that can be detected if they somehow contaminate the process stream are of great value.

In this respect, prior attempts consisted of changing the color of the gasket material or adding ferromagnetic additives to its composition. However, both solutions have limitations regarding accurate tracking of the source of contamination. To start, the first alternative only allows the foreign bodies to be identified if the fragment is close to the surface and, sometimes, this identification only occurs after the destruction of large quantities of product, wasting thus money and time. The second solution, in turn, has the limitation that the additives may not be distinguishable from their surroundings, and one cannot truly identify if the contamination is due to a failure in the gasket material or another component of the process stream. Besides that, ferromagnetic additives may be associated with oxidation problems during the sintering process of gasket materials.

Regarding compression packing, compression packing is one of the most common sealing elements for leakage control used in the refining, chemical, pharmaceutical, marine, pulp and paper industries and other industry segments. Compression packing involves the insertion of packing elements made from soft, pliant materials into the space (i.e., the stuffing box) to seal between a rotating or reciprocating member of a pump or valve and the body of the pump or valve. When bolt stress is transmitted to the compression packing, the materials compress axially and expand radially inside the stuffing box, creating a seal.

Compression packing represents a compromise between leakage control and packing friction. A compression packing that has a sealing surface with a high coefficient of friction will increase the power required to actuate the equipment and halt the equipment actuation in extreme cases. This problem is present in all types of equipment that use compression packings but is critical in control valves, where a quick response time is required.

Because compression packings are used in many different types of equipment under a broad range of conditions, they come in a wide variety of constructions, configurations, materials, dimensions, shapes, and sizes. The following is a description of the most common packing constructions and their characteristics.

A square braid packing is formed by weaving strands of yarns, ribbons, and other various materials, either alone or in combination, over and under other strands running in the same direction. Such processing can yield packings either in a square or a rectangular cross-section. The square braid packings, which are usually soft and pliable and capable of carrying a large percentage of lubricant, are typically used for high-speed rotary service at relatively low pressure. Additionally, the softness of a square braid packing allows for its use on older or worn equipment.

Square braid packings commonly come in nominal sizes of up to 6 mm (¼ inch). A 2-track square braid, in which eight yarns are woven around 4 corner strands into a 2-track plait, may form rougher packings in larger dimensions.

An interbraid packing, also called a cross-braid or diagonal braid packing, is made by weaving yarns, ribbons, and other forms of materials, either alone or in combination, in a crisscross manner from the surface diagonally through the body of the packing. Each strand is strongly locked by other strands, thereby providing an integral structure that resists unraveling. The weaving pattern of such interbraiding evenly distributes the strands throughout the packing and yields a dense, flexible structure that exhibits improved lubricant retention.

For interbraid packings, if a larger cross-section is needed, a 3- or 4-track diagonal braid may be used. The construction of a 3-track braid, which commonly comes in nominal sizes of between 5 and 12 mm (3/16 and 1/2 inch), involves the use of braiding machines having between 12 to 20 carriers. For 4-track braids, which typically come in dimensions from 10 to 80 mm (3/8 to 3 inches), a braiding machine having 24, 32, or more carriers is used.

Braid-over-braid packings are concentric or round braids that include a thin tubular jacket made from yarns, ribbons, and other forms of materials, which is braided around a core material. This type of construction can yield round, square, or rectangular cross-sections.

Like diagonal braid packings, the braid-over-braid packing construction also provides a fine and dense surface structure but is not as abrasion resistant. Several layers of braid-over-braid construction may be braided over a core to increase the packing size or density. Depending on the size of the packing machines, 16, 48, or more carriers may be used. Additionally, core materials can include either parallel or twisted yarns, both of which provide elasticity and flexibility. Cores made from extruded rubber or elastomers may also be used.

The braid-over-braid packings can have rectangular or round cross-sections, in addition to square shapes, depending on the shape of the packing. Large endless concentric packing rings can be produced with special braiding machines where the top of the machine can be split.

Another type of packing construction, known as braid-over-core, involves the braiding of one or more jackets of yarns, ribbons, or other forms of various materials over a core, which may be twisted, knitted, wrapped or extruded. This type of construction can be used to make packings of a variety of densities and cross-sections.

In addition to each packing construction, a combination of two or more packing constructions may be used, known as a combination packing set. Combination packing sets are commonly intended to prevent packing extrusion and consist of adding anti-extrusion rings to both ends of a packing set. These rings resist higher pressures than the packing material between them, thereby preventing extrusion of the packing through the clearances in the stuffing box. One typical combination packing set involving anti-extrusion rings includes carbon filament end rings with flexible graphite rings. End rings made of metal discs or machined plastics, or other similar materials, may also be used.

Die-formed packing comes in a pre-compressed ring form. This type of construction involves the compression of packing materials within a tooling die of a specified size. In this manner, packing materials can be supplied with a specific density and size.

Besides these above packings, there are other types of packing constructions, such as extruded packings, laminated packings, wrapped, rolled and folded packings, molded packings, machined packing rings and flexible graphite tape.

The Environmental Protection Agency ("EPA") regulates emissions and air quality in the United States. When the EPA conducted investigations on the sources of fugitive emissions it was determined that the largest source of such emissions was process equipment used in refineries and chemical plants. According to Elliott MacKay, J. (2004), in "*Detection Of Fugitive Emissions From Valve Stems—DC Resistance Response And Gas Adsorption Over Tin Dioxide Mixed With Alumina*", University of British Columbia, it is estimated that valves account for 60% to 85% of such fugitive emissions.

To ensure that such refineries and chemical plants are following the Clean Air Act ("CAA") Regulations, the EPA conducts plant audits, and if the plant is found to be exceeding mandated emission limits, the EPA enters into a legally binding consent decree with the offending party. These consent decrees are made publicly available by the EPA on its website. Under a consent decree, the refineries and chemical plants are still allowed to operate, but leak levels are closely monitored and expected to be lowered, and usually certified low emissions technology packings and valves are required. According to Paeffgen N. (2014), Elise, in "*EPA To Review Consent Decrees To Ensure Compliance*", Alston & Bird LLP, as of 2011, 90 percent of the petroleum refining sector was subject to an EPA consent decree.

For a packing to be considered "Certified low Emissions Technology", as defined by the EPA in the Enhanced Leak Detection and Repair ("LDAR") Program Part G—Equipment Upgrades, Replacement and Improvement, the packing manufacturer must issue a written guarantee that the packing will not leak more than 100 parts per million (ppm) when sealing pressurized volatile organic compounds ("VOC"), such as methane, for a total of five years. Usually, the guarantee is also backed up by an equivalent document showing that the packing was tested according to generally accepted good engineering practices and standards.

The most common standard used to test packings for low emissions is from the American Petroleum Institute, ("API") 622: Type Testing of Process Valve Packing for Fugitive Emissions, Third Edition. Testing on this standard qualifies the packing, and the test takes place on a standardized test rig and not in an actual valve. During the test, the packing is subject to 1,510 mechanical cycles and 5 thermal cycles, which is considered a good representation of an isolation valve lifecycle. The test rig is pressurized with 40 bar of methane, which is a type of VOC. Leakage cannot exceed 100 ppm at any moment and no retorques are allowed, which matches the LDAR required performance, as mentioned above.

Another standard that is used by the industry is from the International Organization for Standardization, ("ISO") 15848-1 Industrial valves—Measurement, test and qualification procedures for fugitive emissions. This standard qualifies the valve design and has different procedures to account for isolation and control valves. Since it addresses control valves, which are much more frequently actuated, it allows for much more extensive testing, in the most extreme class the test is composed of 100,000 mechanical cycles and 4 thermal cycles. It does not specify a standardized test rig and instead, the test is carried out on an off the shelf valve. The test result should not be interpreted exclusively as a packing evaluation but as a valve evaluation.

Even though some packing manufacturers do offer low emissions technology warranties, identifying the compression packing after it has been used in the field and confirming it was a certified product compatible with fugitive emissions service is an open problem to this day. Packings are usually subjected to high compression, friction wear and contact with process fluid during operation, and end up with a significantly different structure, appearance, and composition. The most commonly used method in the industry to identify compression packing is through tags and labels. However, such external identifications can be moved, misplaced or accidentally destroyed, and when that happens, the information intended to enable identification of the compression packing being used is lost.

The low emissions rates mandated by the EPA and the previously mentioned fugitive emissions standards usually require a high packing installation stress. This is to ensure a low emission service even after system relaxation takes place during the equipment lifecycle. This high installation stress typically causes standard packings to extrude between the valve stem and the stuffing box. For soft packings, this can only be solved using anti-extrusion rings, which represents added cost and complexity.

Flexible graphite packings are the most common solution for low emissions, as they offer good sealability allied with low surface friction. Even with those positive properties, manufacturing can be challenging as flexible graphite tapes are very fragile and are not able to withstand the forces involved during the braiding process. Pure flexible graphite packings are therefore made with alternative processes, such as graphite molding, but packings made by those processes are not able to achieve the performance class required by fugitive emissions standard such as API 622.

For flexible graphite tape to resist the braiding process, reinforcements are used to increase its mechanical resistance. The most commonly used reinforcements are cotton, acrylic, fiberglass, and metal. Cotton and acrylic reinforcements are not suitable for low emissions technology, as they cannot withstand the temperatures of this type of application. Fiberglass reinforcement can resist high temperatures but is not able to achieve the performance required by the fugitive emissions standards. Metallic reinforcement is a significant improvement to the previous alternatives and is what is currently used by the state-of-the-art solutions for low-emission technology. This reinforcement has two main downsides, it further increases the friction generated by contact with the packing and can scratch the surface of the valve stem and create leak paths.

Metallic reinforced flexible graphite packings are a good fit for some applications, particularly very high temperature ones, but alone they are not able to achieve the performance required by the fugitive emissions standards. To achieve such low emissions levels, blocking agents are added as coatings to the packing. The most commonly used agent is polytetrafluoroethylene (PTFE), which not only helps with lowering the emissions but also acts as a lubricant, thus reducing friction. This still does not solve the problem of metallic reinforcement scratching the surface of the valve stem.

The above-mentioned blocking agents, however, are not fire or high-temperature resistant, and thus many standards and end-users strictly limit the amount of PTFE that may be added as a coating. For example, the American Society of Testing Materials ("ASTM") F2191 limits the PTFE coating to less than 5% in volume. API 622, specifically includes weight loss and fluorine content tests to be included in its final report for this reason. Controlling the PTFE content and keeping it to a minimum is important, because, all the lost mass due to its degradation under temperature is translated into system stress loss, and thus, potential leakage.

Hydrocarbon processing in refineries and petrochemicals requires packing to be fire-resistant. Standard API 607: Fire Test for Quarter-turn Valves and Valves Equipped with Nonmetallic Seats, Seventh Edition specifies fire type-testing requirements and a fire type-test method for confirming the pressure-containing capability of a packing sealed valve under pressure during and after the fire test. To be used in refineries and petrochemicals the packings must have this approval guaranteeing the ability of the packing to seal during a fire. Typically, flexible graphite packings are capable of attaining fire safety approval.

The use of these graphitic packing materials further requires special attention to the possibility of galvanic corrosion, an electrochemical reaction occurring between a metal and graphite or other carbon material, or between two different metals, that are submerged in an electrolyte. Under these conditions, corrosion of the material closer to the anodic end of the galvanic series may occur. The potential voltage difference among the materials will determine how fast corrosion will occur, with a larger difference yielding a faster corrosion rate.

Galvanic corrosion is associated with the use of compression packing when a carbon or graphite-based sealing element is used in equipment such as a valve having a metallic stem or shaft. Since steel is more anodic than graphite, when the valve is exposed to an electrolyte, such as in a hydrostatic test, the stem can face galvanic corrosion, facilitating the creation of leak paths.

SUMMARY OF THE DISCLOSURE

The present disclosure relates to composite gasket materials, methods of manufacturing the composite gasket materials, and gaskets formed using the composite gasket materials. The disclosed composite gasket materials are especially useful in the food and beverage industry, which monitors for any foreign body contamination within food and/or beverage products. This industry commonly uses metal detection equipment, optical scanners, or X-ray to detect foreign body contamination during the food/beverage manufacturing processes. The disclosed embodiments relate to a sintered polytetrafluoroethylene ("PTFE") gasket material comprising metallic powder and traceable particles, and methods of manufacturing the same. Using gaskets comprising metallic powder, traceable particles or both metallic powder and traceable particles is beneficial in any manufacturing processes that requires strict foreign body contamination detection. The metallic powder allows contamination from the composite gaskets to be easily detected with the standard metal detectors used by the said industry. The traceable particles retain information of the gasket material fabrication and allows the contamination to be traced back to the exact origin of the material detected. These particles (e.g., traceable particles) resist severe application conditions with chemically aggressive fluids, abrasion, high pressures, and even elevated temperatures. As such, the addition of traceable particles is a permanent identification method implanted in the gasket that cannot be misplaced, switched off, or lost. The addition of traceable particles to a gasket provides benefits over conventional gaskets, such as improved reliability when identifying the source of contamination. The benefit is not only identifying a composite gasket that may be contaminating a manufacturing process, but also determining that contamination is not related to the composite gasket (e.g., when the contamination does not contain the tracer particles). This tracking method is more reliable than the written methods, and other currently available forms, of identification being currently used. This tracking method is particularly useful for users who need to ensure they are using a non-contaminating product and that have the need to identify the precise origin in case of contamination.

The present disclosure also relates to a compression packing. The compression packing of the present disclosure carries particles that retain information of its fabrication and can be used to trace the packing. The tracer particles will resist severe application conditions with chemically aggressive fluids, abrasion, high pressures, and even elevated temperatures. The tracer particles provide a permanent identification method embedded in the compression packing that cannot be misplaced, switched off or lost. The tracer particles are much more reliable than the written and other currently available forms of identification being particularly useful for end-users who must ensure they are using a warrantied compression packing. Companies operating under an EPA consent decree for violation of the Clean Air Act are required to use low emission valve technology (including its compression packing assembly) and to issue a written warranty that their products will not emit fugitive emissions above a specific level and if they do so at any time within the first five years of service, they will replace the product. The present disclosure allows the identification of the warrantied packing itself avoiding claim complications that emerge from incorrect product identifications. Moreover, the compression packing of the present disclosure can be made extrusion resistant and compatible with fugitive emissions service without the use of any metallic reinforcement, as is common in the industry.

DETAILED DESCRIPTION

Figure 1:
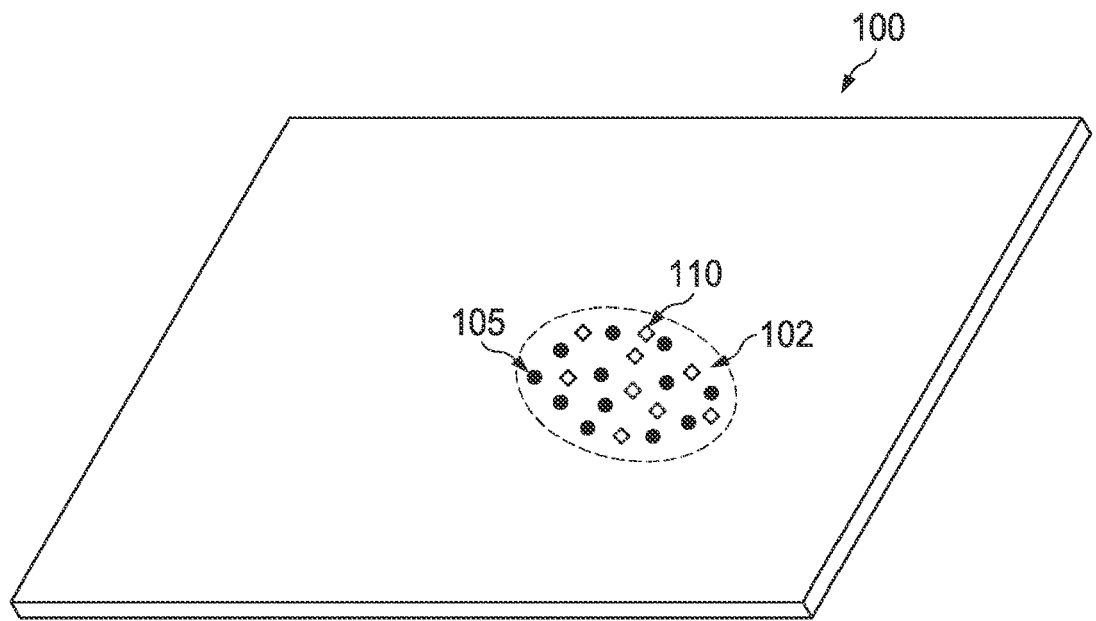
FIG. 1 illustrates a perspective view of a traceable composite sheet, according to an example embodiment of the present disclosure.

Reference is now made to the drawings that illustrate certain embodiments of the present disclosure. It should be understood that the disclosure is not limited to the embodiments shown in the drawings.

According to an example embodiment of the present disclosure, FIG. 1 illustrates a perspective view of a traceable composite sheet and is generally referred to by the reference numeral 100. In some embodiments, the sheet is a PTFE sheet 100. In some embodiments, the sheet 100 includes a sintered PTFE matrix 102, metallic powder 105, and traceable particles 110. As both the metallic powder 105 and the traceable particles 110 cannot be seen without the use of a specific identification method, a dotted circle illustrates a region of the traceable composite sheet 100 that shows the distribution of the powder 105 and the particles 110 within the matrix 102. The sheet 100 is traceable composite gasket material.

Figure 2:
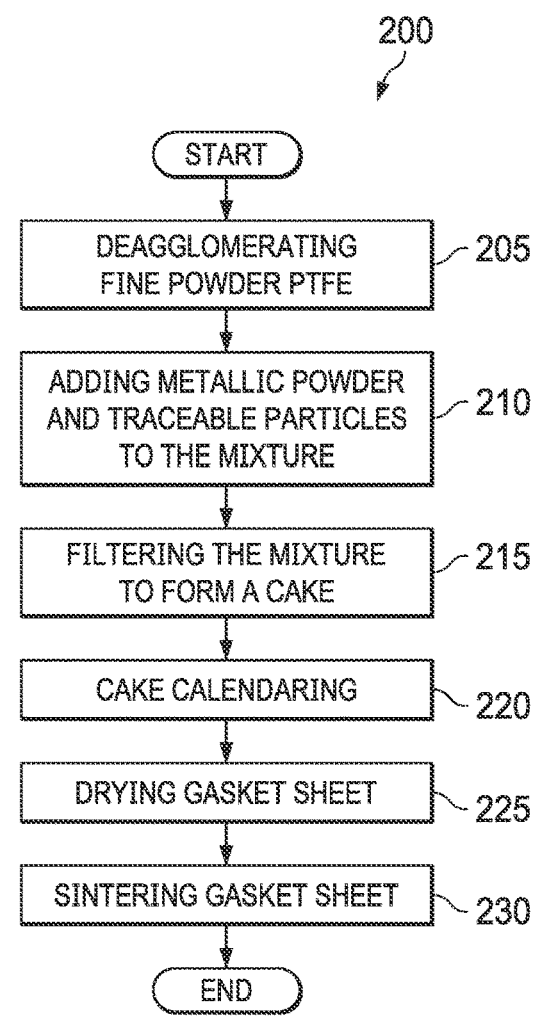
FIG. 2 is a flowchart of a method of manufacturing the traceable composite sheet of FIG. 1, according to an example embodiment.

FIG. 2 shows a method of manufacturing the traceable composite sheet 100 and is generally referred to by the reference numeral 200. The sheet 100 can be manufactured using a process that is similar or identical to conventional processes, such as the DuPont "HS-10" or "HS 10" process as known in the art. Referring to FIG. 2, the method 200 of manufacturing the traceable composite sheet 100 includes deagglomerating fine powder PTFE at step 205, adding metallic powder and traceable particles to the mixture at step 210, filtering the mixture to form a cake at step 215, cake calendaring to form a sheet at step 220, drying the sheet at step 225, and sintering the sheet at step 230.

In some embodiments and during the step 205, the fine powder PTFE is deagglomerated in a hydrocarbon liquid, such as isoparaffinic hydrocarbon Exxon ISOPAR™ L from Exxon Chemical of Irving, Tex. in any suitable mixing device, such as an industrial mixer. In some embodiments, the fine powder PTFE is PTFE powder with a particle size less than 600 μm. Certain parameters such as the mixing speed and the amount of the hydrocarbon liquid may be adjusted based on the equipment used. Generally, a PTFE mixture is created during the step 205.

In some embodiments and during the step 210, the metallic powder 105 and the traceable particles 110 are added to the PTFE mixture. In some embodiments, the amount of metallic powder added or present in the gasket material is from about 1% to about 70% of the total weight of the gasket material. In some embodiments, the amount of traceable particles is less than 5% of the total weight of the gasket material. The metallic powder 105 and the traceable particles 110 are generally dispersed within the PTFE mixture. In some embodiments, the metallic powder 105 and the traceable particles 110 are homogenously dispersed within the PTFE mixture but in other embodiments, some variations in the positioning of the metallic powder 105 and the traceable particles 110 within the PTFE mixture are expected. The mixing process during the step 210 may be carried out for a period of time, such as from about 5 minutes to 15 minutes, in the same device of step 205 (e.g., the mixing device). However, the step 210 may also be completed using a device that is different from the device in step 205. Even though it may be described as batch processing, a continuous amount of the metallic powder 105 and the traceable particles 110 should be added to the PTFE mixture at a rate sufficient to allow complete mixing.

As noted above, the metallic powder 105 is added during the step 210 and is distributed inside the PTFE mixture or PTFE polymer matrix. The metallic powder 105 may be found in different compositions, particle size distributions and particle morphology. An appropriate metallic powder 105 may comprise stainless steel powder. It shall respond to magnetic fields and to light with a detectable behavior, being easily detected by metal detectors or x-ray inspection devices commonly employed in the process streams of the food and beverage industry.

As noted above, the traceable particles 110 are added during the step 210 and are distributed inside the PTFE mixture or PTFE polymer matrix. The traceable particles 110 can be found in different forms and compositions. Suitable traceable particles 110 may include fluorophores, fluorescent dyes, phosphors, porous silicon and microdots. Even though they can differ slightly with regards to the mechanism used for identification, they are suitable for identifying a gasket formed by the sheet 100 after the gasket is put in service.

According to one embodiment, the traceable particles 110 are formed of fluorophores or fluorescent dyes. According to such an embodiment, suitable fluorophores include chalcogenides, such as selenides, sulfides and tellurides of metals such as cadmium, lead and zinc. Suitable fluorophores also include chemical compounds such as $C_{62}H_{87}N_{13}O_{16}$. Fluorophores are widely commercially available and are fluorescent chemical compounds that absorb light and re-emit light at a specific wavelength. The resulting wavelength of the re-emitted light is typically measured with a microscope equipped with a filter set for the particular fluorophore or fluorescent dyes of interest.

According to other embodiments, the traceable particles 110 take the form of phosphors. Phosphors are materials that absorb light in a wavelength range that is invisible to the naked eye and emit lights in the visible range. There are phosphors that absorb light in both the ultraviolet and infrared range and emit light in multiple colors including red, green and yellow. A specific suitable phosphor is upconverted hexagonal sodium yttrium fluoride (β-NaYF$_4$) which emits visible light in response to infrared excitation. The excitation with all phosphors can be effected with a portable laser pen or an ultraviolet flashlight, depending upon the selection of the phosphor.

According to another embodiment, the traceable particles 110 take the form of porous silicon ("PS"), which is silicon that includes synthetic nanopores added to its microstructure. The porous silicon can be made by methods well known to those of ordinary skill in the art such as by silicon wafer anodization and stain-etching. According to such an embodiment, the nanopores will reflect visible white light. The wavelength of the light is characteristic of the size of the nanopores and their topology in the silicon and can be measured with a standard spectrometer.

According to yet another embodiment, the traceable particles 110 take the form of microdots which are small discs that are typically made of ceramics, polymers and metals. The discs are inscribed, usually by laser, with a pattern of very small dots. The pattern of dots can later be retrieved for identification by inspecting one of the discs with a microscope or similar magnifying technology.

In an additional embodiment, any number of fillers are also added during the step 210. The fillers may be any one or more of barite, silica, natural hollow glass micro-spheres, and synthetic hollow glass micro-spheres.

In another additional embodiment, an inorganic pigment is also added during the step 210. Any inorganic pigment may be used due to the high PTFE sintering temperature.

In some embodiments and during the step 215, the mixture from the step 210 is filtered to remove most hydrocarbon liquid and a cake is formed, with the cake having proper lubrication to pass through a calendaring process.

In some embodiments and during the step 220, the cake of the step 215 passes through calendar rolls in transverse directions to orient the particles of the PTFE matrix, the metallic powder 105, and the traceable particles 110 inside the material. This calendaring process results in a biaxially oriented sheet. The shape and size of the sheet is not limited and can be adjusted.

In some embodiments and during the step 225, the sheet of the step 220 is dried to remove the lubricant. In one embodiment, the step 225 includes conventional methods of drying PTFE in an oven.

In some embodiments and during the step 230, the sheet is sintered at a temperature of from 300° C. to 400° C. to produce the traceable composite sheet 100.

Using the method 200, the traceable composite sheet 100 having the metallic powder 105 and the traceable particles 110 is formed. As noted above, this sheet 100 results in improved traceability and identification of contamination in manufacturing processes. In one embodiment, the amount of the metallic powder 105 is from about 1% to about 70% of the total weight of the composite sheet 100. In another embodiment, the amount of the traceable particles 110 is less than about 5% of the total weight of the traceable composite sheet 100.

Figure 3:
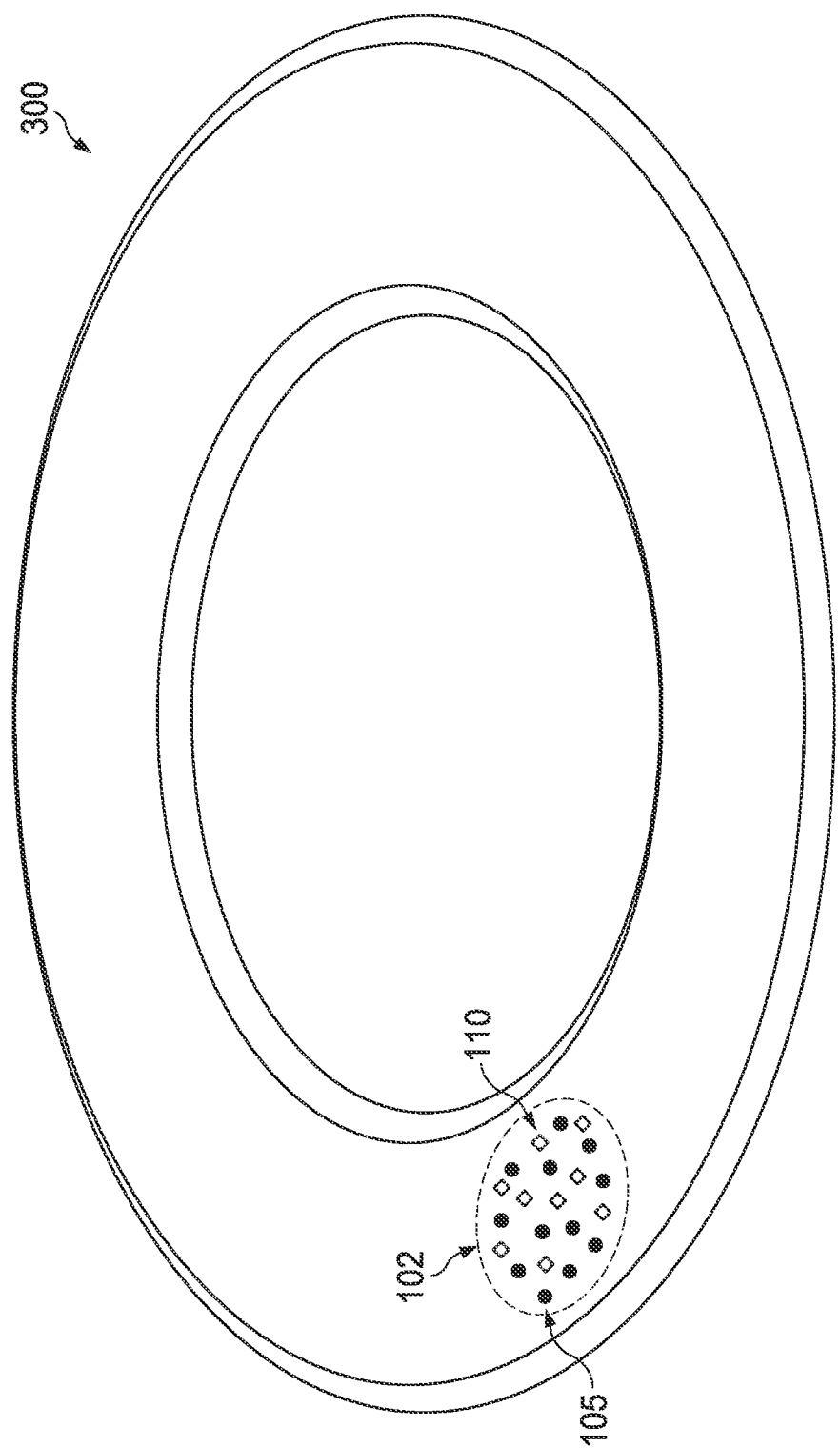
FIG. 3 illustrates a perspective view of a circular traceable composite gasket cut out from the traceable composite sheet of FIG. 1, according to an example embodiment.

Different discrete gaskets can be cut from the traceable composite gasket sheet 100. FIG. 3 illustrates a perspective view of a circular traceable composite gasket and is generally referred to by the reference numeral 300. The gasket 300 was cut out from the traceable composite gasket sheet 100, according to an example embodiment of the present disclosure.

Figure 4:
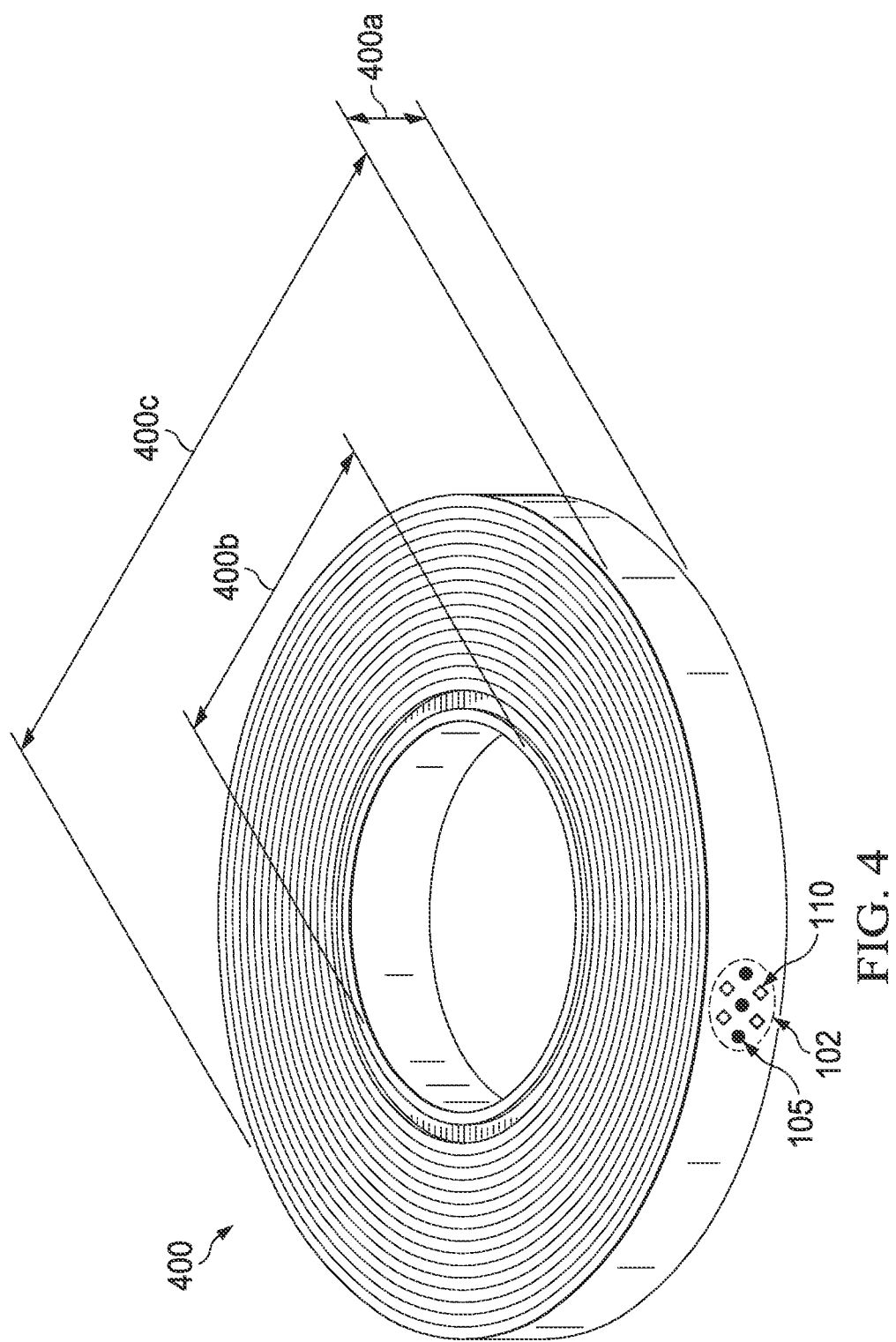
FIG. 4 illustrates a perspective view of another embodiment of a composite gasket with traceable particles, according to an example embodiment.

The traceable composite gasket material can also be made using the methods of manufacture disclosed in U.S. Pat. No. 9,701,058, the entire disclosure of which is incorporated herein by reference. According to another example embodiment of the present disclosure, FIG. 4 illustrates a perspective view of a spirally wound traceable composite gasket and is generally referred to by the reference numeral 400. The gasket 400 includes a sintered PTFE matrix, the metallic powder 105 and the traceable particles 110. Referring further to FIG. 4, the gasket 400 defines a gasket thickness 400a, a gasket inner diameter 400b, and a gasket outer diameter 400c.

Figure 5:
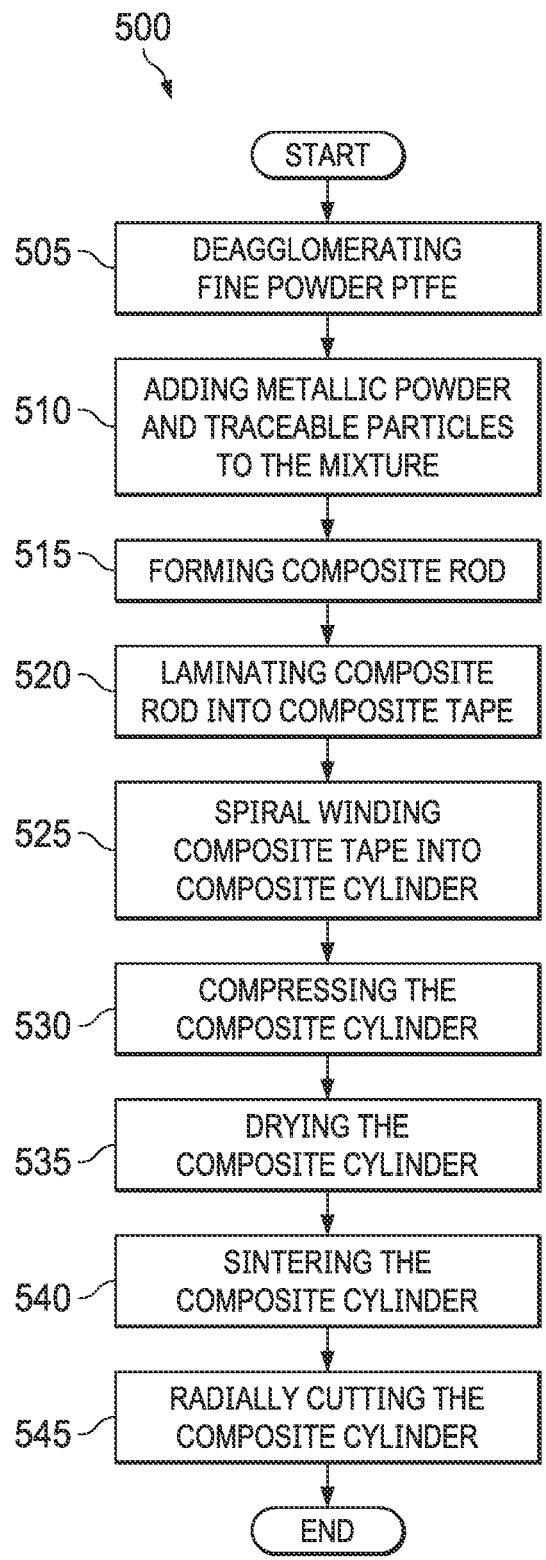
FIG. 5 is a flowchart of a method of manufacturing the composite gasket with traceable particles of FIG. 4, according to an example embodiment.

FIG. 5 shows a method of manufacturing the spirally wound traceable composite gasket 400 and is generally referred to by the reference numeral 500. Referring to FIG. 5, the method 500 of manufacturing the spirally wound traceable composite gasket 400 includes deagglomerating fine powder PTFE with a hydrocarbon liquid at step 505, adding the metallic powder 105 and the traceable particles 110 to the mixture at step 510, forming a traceable composite rod at step 515, laminating the traceable composite rod into a traceable composite tape at step 520, spiral winding the traceable composite tape into a traceable composite cylinder at step 525, compressing the traceable composite cylinder at step 530, drying the traceable composite cylinder at step 535, sintering the traceable composite cylinder at step 540, and radially cutting the traceable composite cylinder at step 545. In some embodiments, the term "laminating" in the step 520 means forming a material in multiple layers. As such, in some embodiments, the traceable composite tape formed in the step 520 is formed of multiple layers of the traceable composite rod.

The disclosed traceable composite gasket material 100 described herein has several features and advantages. One feature and advantage, specifically to industries that monitor, identify, and trace any contamination such as the food and beverage industry, is the ability to identify a seal that may be contaminating products or confirm that a seal is not contaminating products. Another feature and advantage of the traceable composite gasket material 100 is that pieces of the traceable composite gasket material 100 are easily detected with standard metal detectors due to the inclusion of the metallic powder 105. A further example feature and advantage of the disclosed traceable composite gasket material 100 is the ability of the composite gasket material 100 to resist severe application conditions with chemically aggressive fluids, abrasion, high pressures, and even elevated temperatures. An additional feature and advantage of the disclosed traceable composite gasket material 100 is that the composite gasket material 100 has traceable particles that retain information of its fabrication and can be used to trace the exact origin of the material detected. Yet another feature and advantage of the disclosed traceable composite gasket material 100 is that the composite gasket material 100 has a permanent identification method implanted in a product fabricated with the composite gasket material 100 that cannot be misplaced, switched off, or lost. A still further feature and advantage of the disclosed traceable composite gasket material 100 is it has a much more reliable tracking method than the currently available forms, which is particularly useful for users that need to identify its precise origin in case of contamination.

Figure 6:
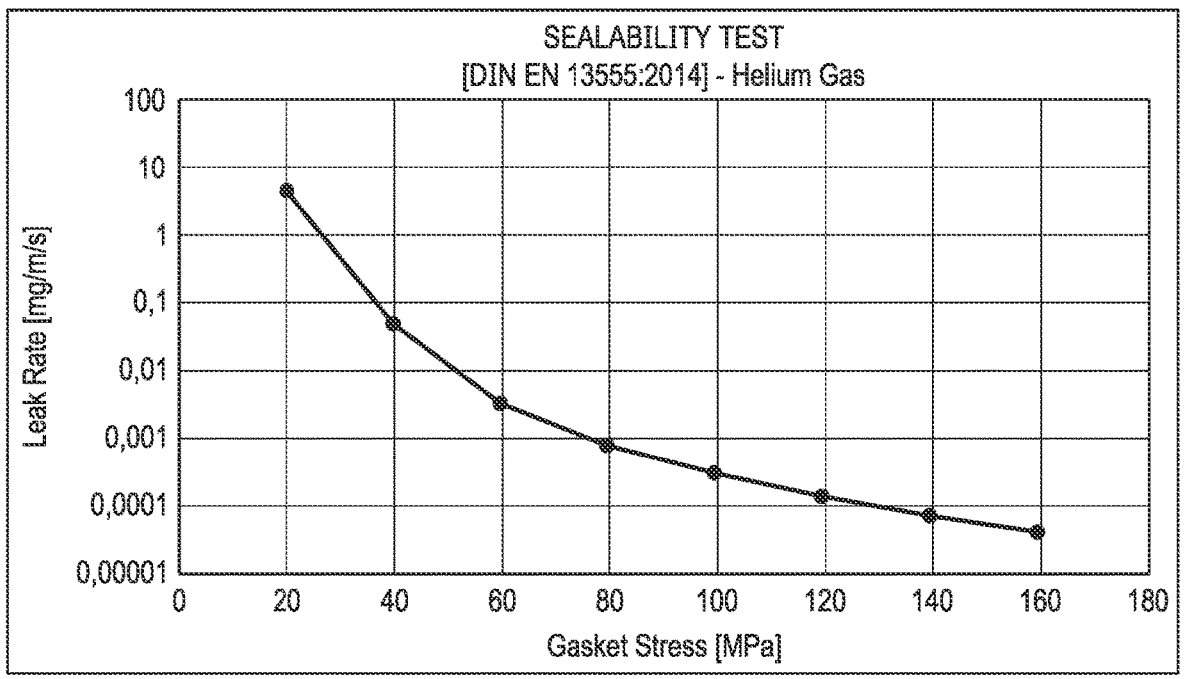
FIG. 6 illustrates the results of a sealability test using an embodiment of the present disclosure.

FIG. 6 is a chart depicting a sealability test result of a gasket according to an example embodiment of the traceable composite gasket 300. The sealability test of FIG. 6 was carried out according to the DIN EN 13555:2014 standard, titled Flanges and Their Joints—Gasket Parameters and Test Procedures Relevant to the Design Rules for Gasketed Circular Flange Connections, at ambient temperature. The embodiment of the traceable composite gasket 300 tested meets the standard requirements.

Figure 7:
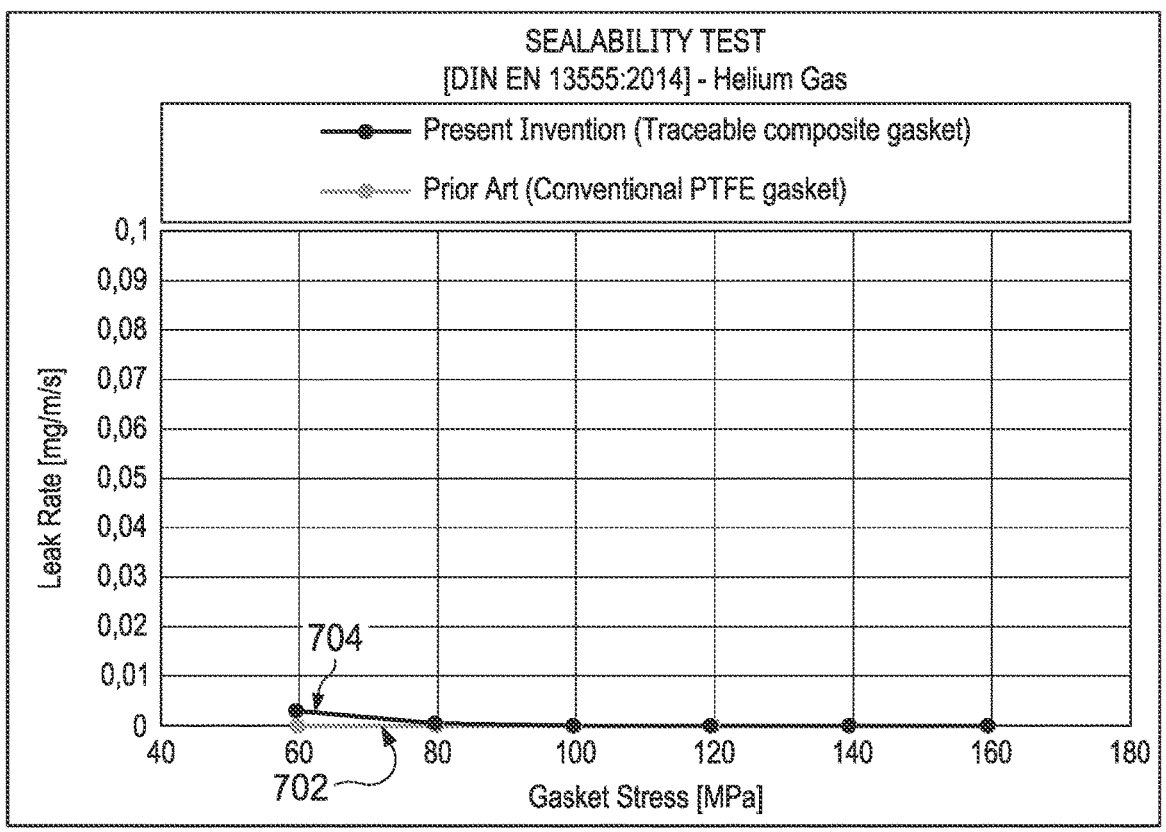
FIG. 7 illustrates comparative sealability test results of gaskets according to embodiments of the present disclosure and other types of PTFE gasket materials.

FIG. 7 is a chart depicting comparative sealability test results of gaskets according to an example embodiment of the traceable composite gasket 300 and a conventional PTFE gasket. Test results associated with a conventional PTFE gasket are illustrated by the line 702 and the test results associated with the example embodiment of the traceable composite gasket 300 are illustrated by the line 704. The conventional PTFE gasket was filled with hollow glass micro-spheres and was cut off from a PTFE sheet manufactured by a process similar to the HS-10 method. The sealability tests of FIG. 7 were carried out according to the DIN EN 13555:2014 standard, titled Flanges and Their Joints—Gasket Parameters and Test Procedures Relevant to the Design Rules for Gasketed Circular Flange Connections, at ambient temperature. The embodiments tested were subjected to the minimum gasket surface pressure to ensure the initial seal, and helium was a test media. As shown in FIG. 7, the addition of the metallic powder 105 and the traceable particles 110 does not interfere on the sealability characteristics of the tested embodiment of the traceable composite gasket 300.

Figure 8:
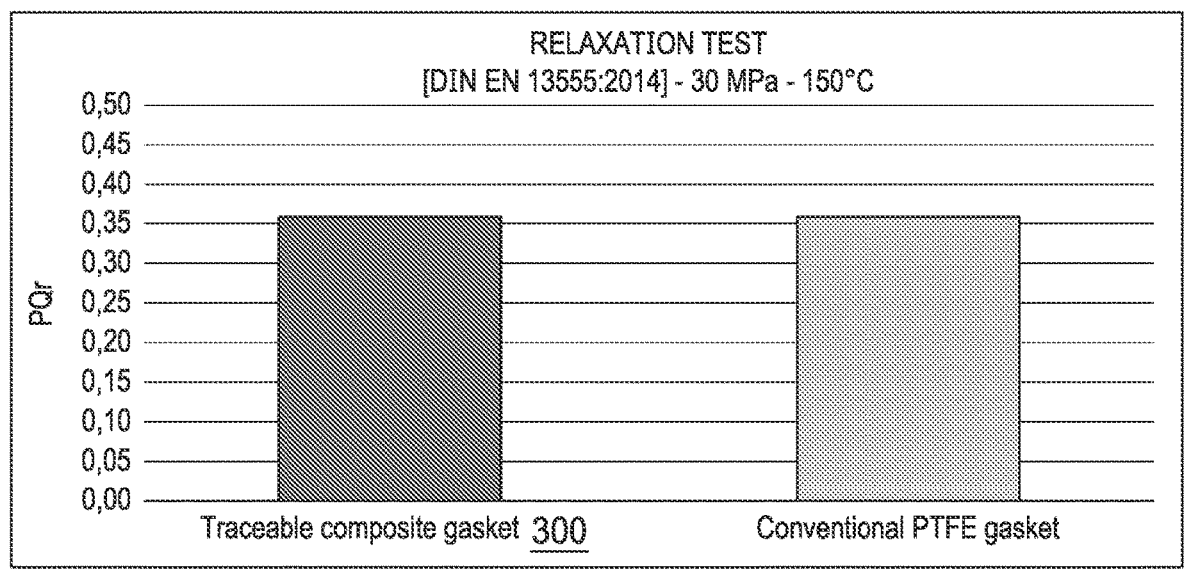
FIG. 8 illustrates comparative test results of gaskets according to embodiments of the present disclosure and other types of PTFE gasket materials.

FIG. 8 is another chart depicting test results of a gasket according to an example embodiment of the traceable composite gasket 300 and a conventional PTFE gasket. The conventional PTFE gasket was filled with hollow glass micro-spheres and was cut off from a PTFE sheet manufactured by a process similar to the HS-10 method. The tests of FIG. 8 were carried out according to the DIN EN 13555:2014 standard, titled Flanges and Their Joints—Gasket Parameters and Test Procedures Relevant to the Design Rules for Gasketed Circular Flange Connections, in which the creep relaxation factor was determined from a relaxation test in a dedicated test rig considering an initial load of 30 MPa and a temperature of 150° C. As shown in FIG. 8, the addition of the metallic powder 105 and the traceable particles 110 does not interfere with the mechanical characteristics of the tested embodiment of the traceable composite gasket 300.

Laboratory tests were developed to assess the magnetic force of several embodiments of the traceable composite gasket 300. The test consisted of fixing an embodiment of the traceable composite gasket 300 into a permanent magnet and then applying a vertical load until the detachment of the gasket 300. The tests highlighted that the traceable composite gasket material is magnetic, and its magnetic force increases with the weight percentage of the metallic powder 105.

Laboratory tests were developed to assess the interaction with magnetic fields of several embodiments of the traceable composite gasket 300. The test consisted in using a commercial metal detector, model MetroTokyo MTK-3000, to track the example embodiments. The tests highlighted that the traceable composite gasket material can be easily detected by the industrial metal detectors commonly used by the food and beverage industry.

Figure 9:
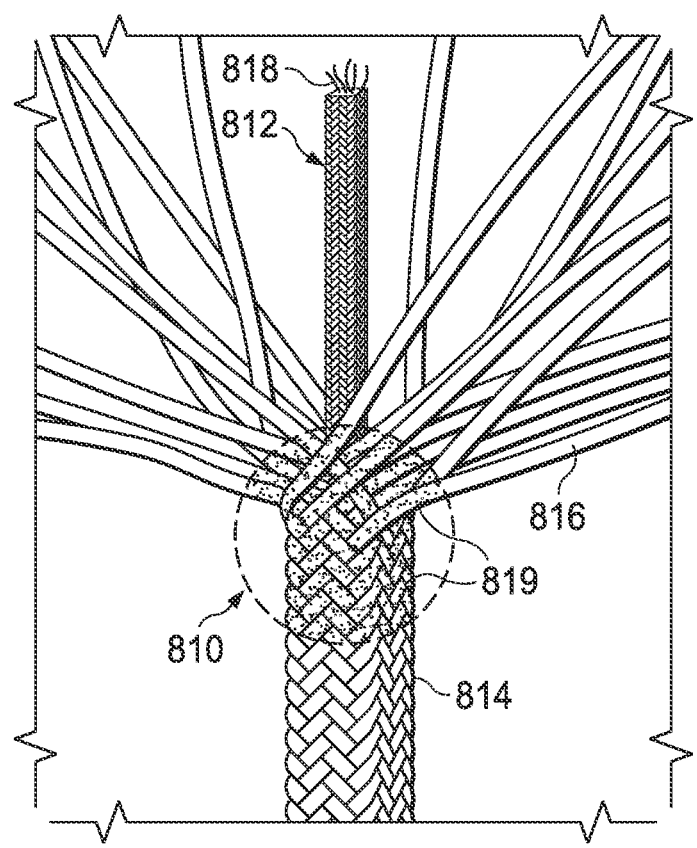
FIG. 9 illustrates a partially exploded view of an embodiment of the compression packing according to the present disclosure.

FIG. 9 illustrates a partially exploded view of an embodiment of the compression packing of the present disclosure. As shown in FIG. 9, the illustrated embodiment is a compression packing with anti-extrusion properties 810 which includes an interbraided core 812 made of a composite yarn that includes flexible graphite tape reinforced with a PTFE filament 816 with tracer particles, and an outer layer 814 of the PTFE filament 816. The flexible graphite tape is commercially available from many sources including Zhejiang Cathay Packing & Sealing Co Ltd of Puyang Industrial Zone Xiaoshan District Hangzhou, China. The PTFE filament may be produced by techniques well known to those of ordinary skill in the art such as by extruding PTFE resin through a die to result in a PTFE filament having a linear density of from about 30 to about 1100 denier. The flexible graphite tape may be reinforced with the PTFE filament by techniques well known to those of ordinary skill in the art such as by knitting, twisting or arranging the flexible graphite tape and the PTFE filament in a side-by-side orientation. While the tracer particles cannot be seen without the use of specific identification methods, for purposes of illustration only a dotted circle demarcates a region of the outer layer 814 which shows the distribution of tracer particles 819. A more detailed explanation of the available identification methods is set forth below. To inhibit galvanic corrosion, zinc wires 818 may be added to the interbraided core 812. Those of ordinary skill in the art will recognize that other corrosion inhibitors including passive corrosion inhibitors such as phosphate, barium molybdate and sodium molybdate may also be used. According to another embodiment, the PTFE filament includes a PTFE matrix and traceable particles wherein the traceable particles are distributed throughout the filament, and resist, friction, temperature, pressure and abrasion without loss of information.

Throughout the disclosure, the terms "traceable particles" and "tracer particles" are used interchangeably.

Figure 10:
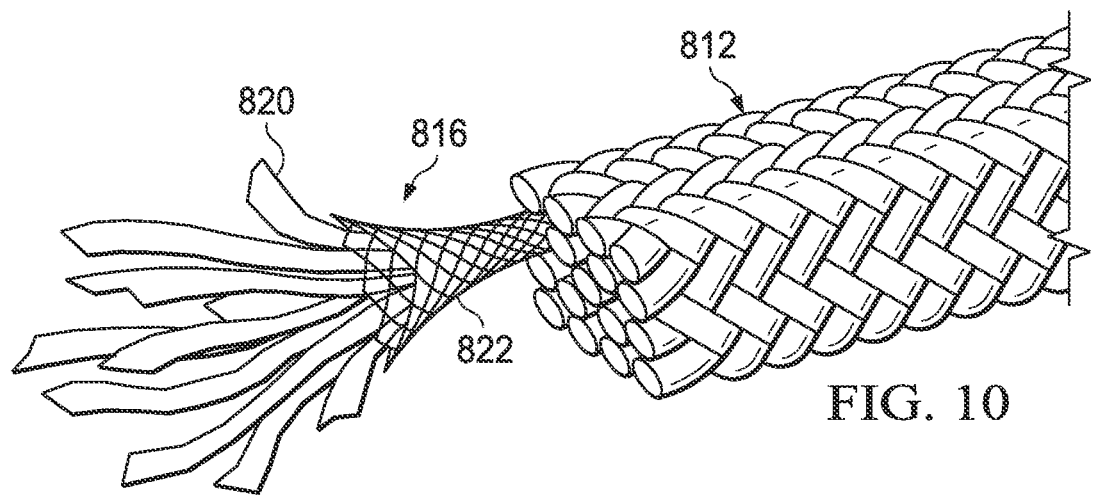
FIG. 10 illustrates a core made from flexible graphite tape reinforced with a PTFE filament with tracer particles.

FIG. 10 shows further details of the interbraided core 812. Specifically, the composite yarn 816 is shown as including a flexible graphite tape 820 that is reinforced with a PTFE filament 822 that includes tracer particles.

Figure 11:
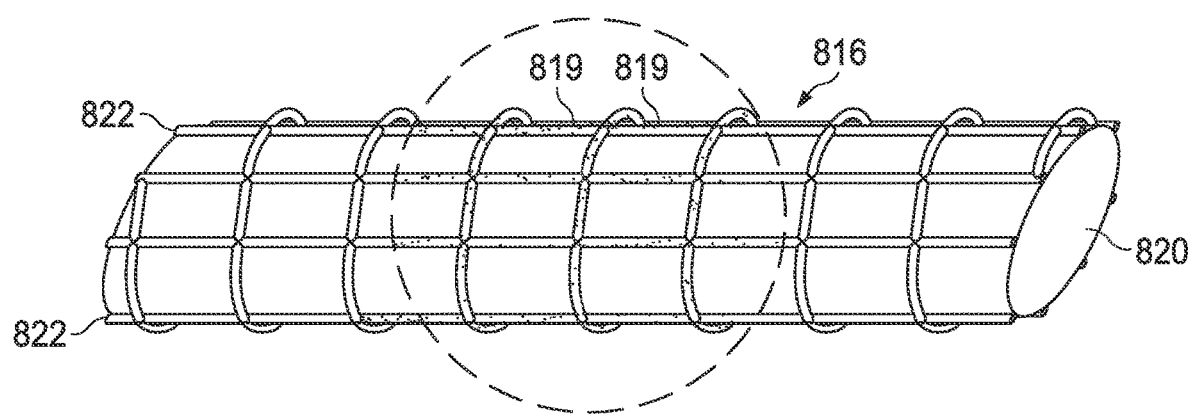
FIG. 11 illustrates a perspective view of an embodiment of the flexible graphite tape reinforced with a PTFE filament with tracer particles in a knitted configuration, showing the distribution of the tracer particles.

FIG. 11 shows an embodiment of the composite yarn 816 where the PTFE filament with tracer particles 822 is knitted as a jacket and used as a reinforcement for the flexible graphite tape 820. Attention is drawn to the tracer particles 819. Since flexible graphite tape 820 is extremely fragile, the PTFE filament with tracer particles 822 acts as a reinforcement and has the function of increasing the mechanical resistance of the composite yarn 816 so as to allow it to withstand the braiding process without degradation. Those of ordinary skill in the art will recognize that the PTFE filament with tracer particles 822 may be added as a reinforcement to the flexible graphite tape 820 in many other suitable ways.

The tracer particles 819 are added during the manufacture of the PTFE filament 822 and are distributed inside its polymer matrix. As noted above, since the tracer particles are not visible without the use of specific identification methods, FIG. 9 includes a dotted circle that demarcates a region of the outer layer 814 that shows the distribution of the tracer particles 819. While the distribution of the tracer particles 819 in the PTFE filament with tracer particles 822 is not shown in FIG. 10, those of ordinary skill in the art will recognize that the distribution of such tracer particles is similar to that shown in FIG. 9. The tracer particles 819 are resistant and will not be damaged so long as the compression packing 810 is used within its operational limits. If degradation occurs, it is an indication that the operational limits were exceeded.

The tracer particles 819 can be found in different forms and compositions. Suitable tracer particles 819 may include fluorophores, fluorescent dyes, phosphors, porous silicon and microdots. Even though they can differ slightly with regards to the mechanism used for identification, they are suitable for identifying the compression packing after service.

According to one embodiment, the tracer particles 819 are formed of fluorophores or fluorescent dyes. According to such an embodiment, suitable fluorophores include chalcogenides, such as selenides, sulfides and tellurides of metals such as cadmium, lead and zinc. Suitable fluorophores also include chemical compounds such as $C_{62}H_{87}N_{13}O_{16}$. Fluorophores are widely commercially available and are fluorescent chemical compounds that absorb light and re-emit light at a specific wavelength. The resulting wavelength of the re-emitted light is typically measured with a microscope equipped with a filter set for the particular fluorophore or fluorescent dyes of interest.

According to other embodiments, the tracer particles 819 take the form of phosphors. Phosphors are materials that absorb light in a wavelength range that is invisible to the naked eye and emit lights in the visible range. There are phosphors that absorb light in both the ultraviolet and infrared range and emit light in multiple colors including red, green and yellow. A specific suitable phosphor is upconverted hexagonal sodium yttrium fluoride ($\beta$-$NaYF_4$) which emits visible light in response to infrared excitation. The excitation with all phosphors can be effected with a portable laser pen or an ultraviolet flashlight, depending upon the selection of the phosphor.

According to another embodiment, the tracer particles 819 take the form of porous silicon ("PS"), which is silicon that includes synthetic nanopores added to its microstructure. The porous silicon can be made by methods well known to those of ordinary skill in the art such as by silicon wafer anodization and stain-etching. According to such an embodiment, the nanopores will reflect visible white light. The wavelength of the light is characteristic of the size of the nanopores and their topology in the silicon and can be measured with a standard spectrometer.

According to yet another embodiment, the tracer particles 819 take the form of microdots which are small discs that are typically made of ceramics, polymers and metals. The discs are inscribed, usually by laser, with a pattern of very small dots. The pattern of dots can later be retrieved for identification by inspecting one of the discs with a microscope or similar magnifying technology.

Tests were developed to evaluate the temperature resistance of the tracer particles 819 after the compression packing 810 is subjected to extreme temperatures. The test exposed the compression packing 810 with the tracer particles 819 to a temperature of 650° C. for 4 hours, which is the maximum temperature to which the compression packing 810 is expected to be subjected. After the test, the tracer particles 819 could still be identified.

Tests were developed to assess the chemical resistance of the tracer particles 819 after the compression packing 810 is subjected to extreme conditions. The test exposed the compression packing 810 to two different environments for 3 months each. The first was a 98% concentration solution of sulfuric acid ($H_2SO_4$) and the second a 50% concentration solution of sodium hydroxide (NaOH). After being subjected to both environments, the compression packing 810 still maintained its structure, and the tracer particles 819 could still be identified.

Tests were developed to evaluate the resistance of the tracer particles 819 in a high frequency valve operation, which is an abrasive operation. The test was executed according to the standard ISO 15848-1, where the compression packing 810 was subjected to 60,000 mechanical cycles and 3 thermal cycles up to 260° C. After the test, the compression packing 810 maintained its structure, and the tracer particles 819 could still be identified. The sealability aspects of this test are set forth below.

According to an embodiment, the PTFE filament 822 may be filled with materials such as, but not limited to, carbon black, graphite, barite, talc and other mineral fillers. The filler may be selected to achieve specific goals such as increasing the resistance of the PTFE filament 822 and thus braiding performance, decreasing the overall PTFE content or decreasing surface friction with, for instance, a valve stem. These fillers do not subtract or intervene with the application of the tracer particles 819 and may be included simultaneously. The PTFE filament 822 may furthermore be made thinner or thicker in relation to the flexible graphite tape 820, for applications where the PTFE content must be finely controlled. Example embodiments have been successfully manufactured and braided with yarns having 4, 10, 16 and 21% of PTFE content, by varying the weight of the PTFE filament 822 in a knitted jacket configuration.

Figure 12:
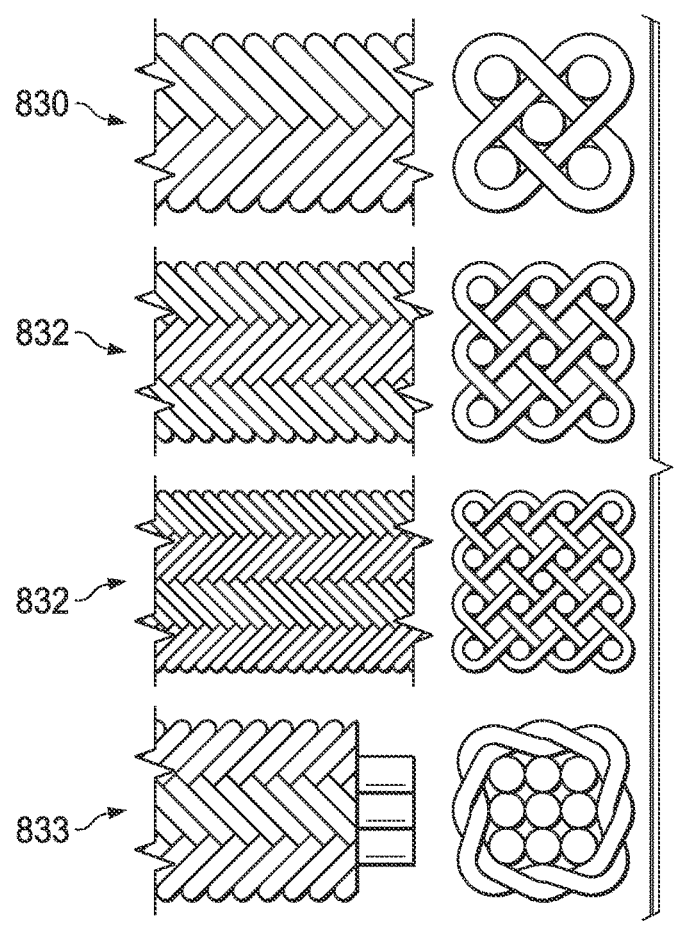
FIG. 12 is a schematic view of types of braiding (square braiding, interbraiding with 3-tracks, with 4-tracks and round braiding).

According to certain embodiments, the interbraided, round braided or square braided core 812 and the interbraided, round braided or square braided outer layer 814 is achieved by diagonally weaving the flexible graphite tape reinforced with a PTFE filament with tracer particles 819 in a crisscross manner from the surface of the core 812 or outer layer 814 through its body. Because of such interbraiding, the various strands of the composite yarns 816 are locked to each other, providing an overall solid integral structure that generally resists unraveling. The weaving pattern of such interbraiding, round braiding or square braiding evenly distributes the various strands of the composite yarns 816 throughout the core 812 and the outer layer 814, respectively, and yields an overall dense and flexible structure. The interbraiding in the illustrated embodiments of FIGS. 9 and 10 include composite yarns 816, but those of ordinary skill in the art of compression packing will understand that other materials, and other forms of these materials other than composite yarns, including tapes, ribbons, and others, may be used to make the interbraided core 812 and the interbraided outer layer 814. FIG. 12 is a schematic view of types of braiding (square braiding 830, interbraiding with 3-tracks 832, interbraiding with 4-tracks 832 and round braiding 833).

Figure 13:
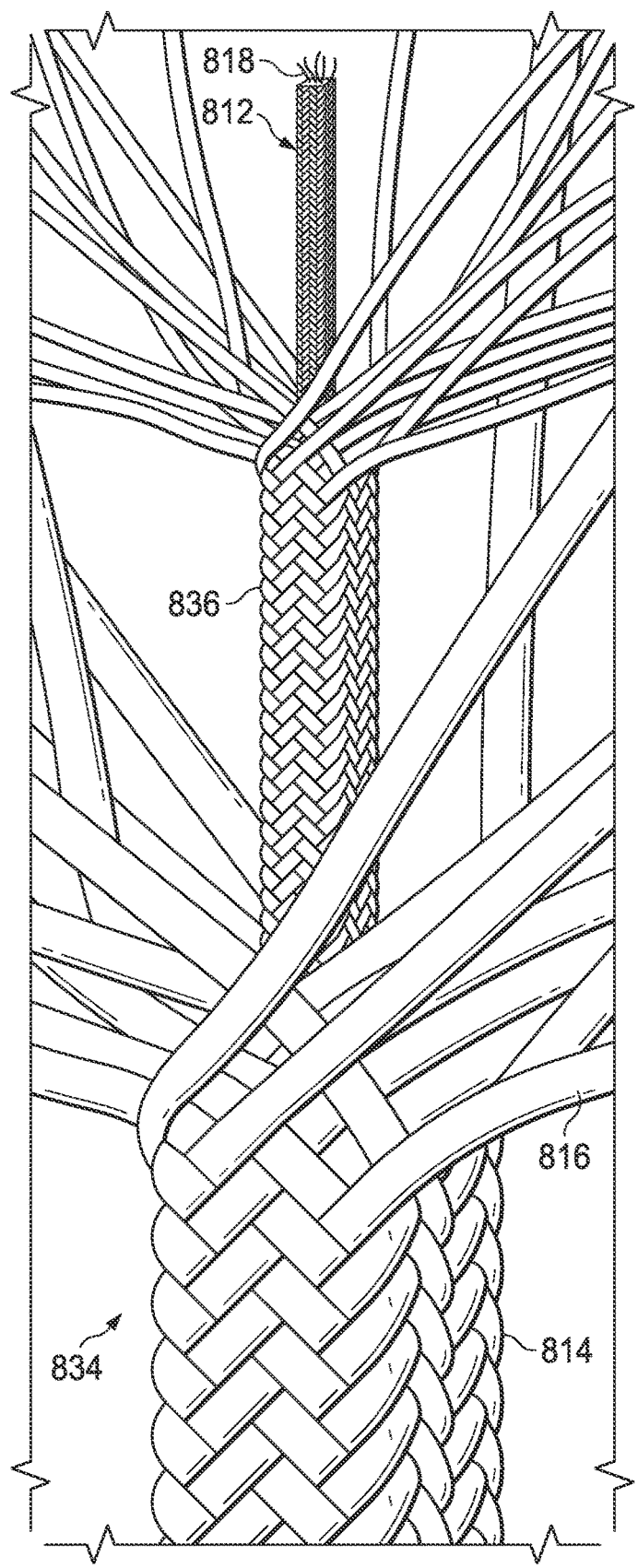
FIG. 13 illustrates an embodiment of the compression packing according to the present disclosure for larger size cross-section packings compared to the smaller size cross-section packings shown in FIG. 9.

According to one embodiment for making the density-controlled core 812 so that it will have the desired density that will guarantee the anti-extrusion properties of the final packing, for the type of relatively small-size cross-section packings, such as those shown in FIGS. 9 and 13, the core includes a single interbraided or square braided core 812.

As shown in FIG. 13, according to another embodiment for making the density controlled core so that it will have the desired density that will guarantee the anti-extrusion properties of the final packing, for relatively large-size cross-section packings, the packing 834 includes a core 812, an interbraided, round braided or square braided layer 836 disposed over an interbraided, round braided or square braided core 812 and an outer layer 814 made of a composite yarn 816 made of interbraided flexible graphite tape with a PTFE reinforced filament with tracer particles.

In certain embodiments of the present disclosure corrosion inhibitors may be added to inhibit galvanic corrosion. As shown in FIGS. 9, and 13, zinc wires 818 may be added to the core 812 to inhibit galvanic corrosion. Those of ordinary skill in the art will recognize that other corrosion inhibitors such as passive corrosion inhibitors including phosphate, barium molybdate and sodium molybdate may also be used.

Figure 14:
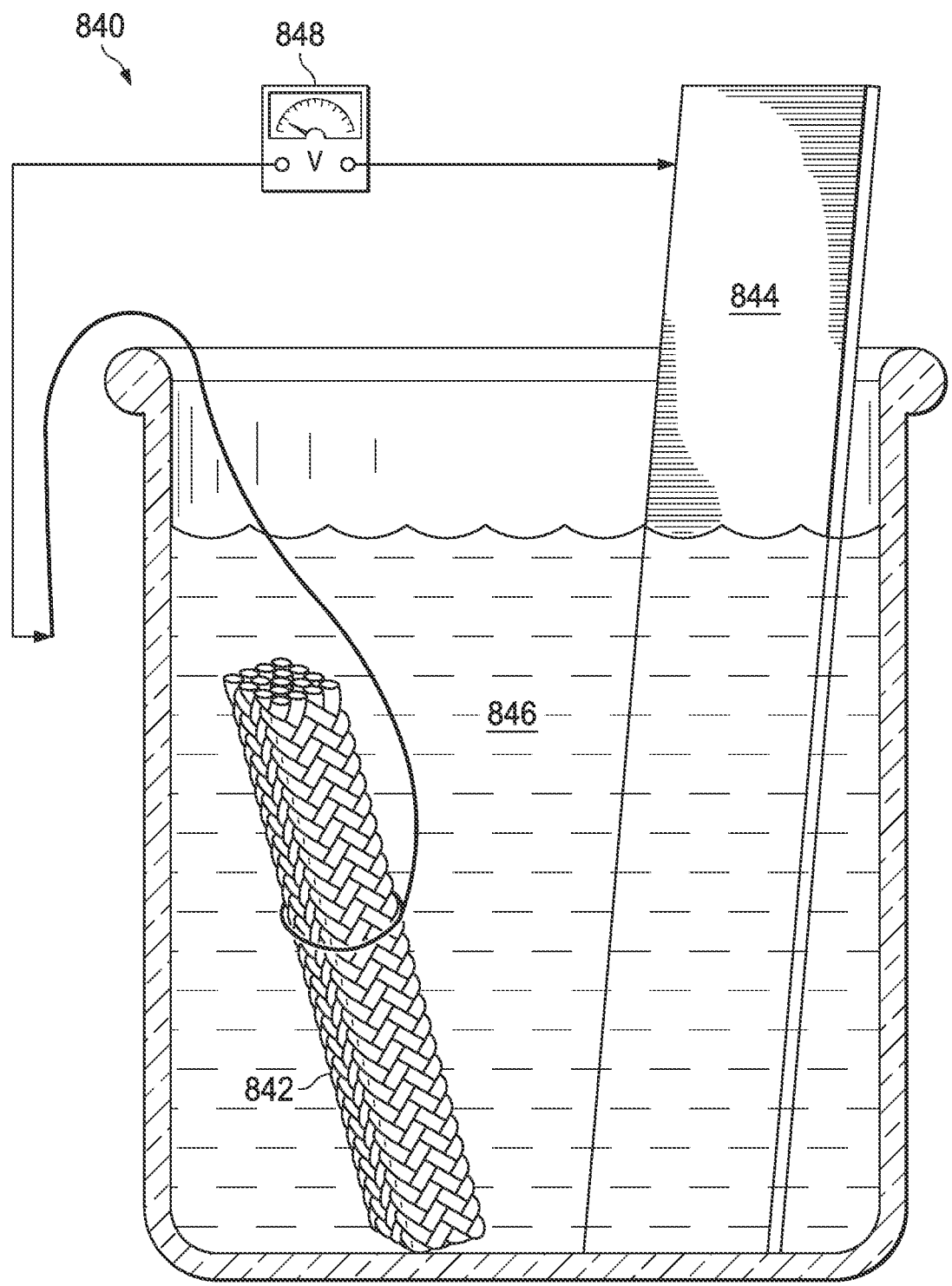
FIG. 14 is a schematic view of a galvanic cell used to evaluate corrosion inhibitor efficiency.
Figure 15:
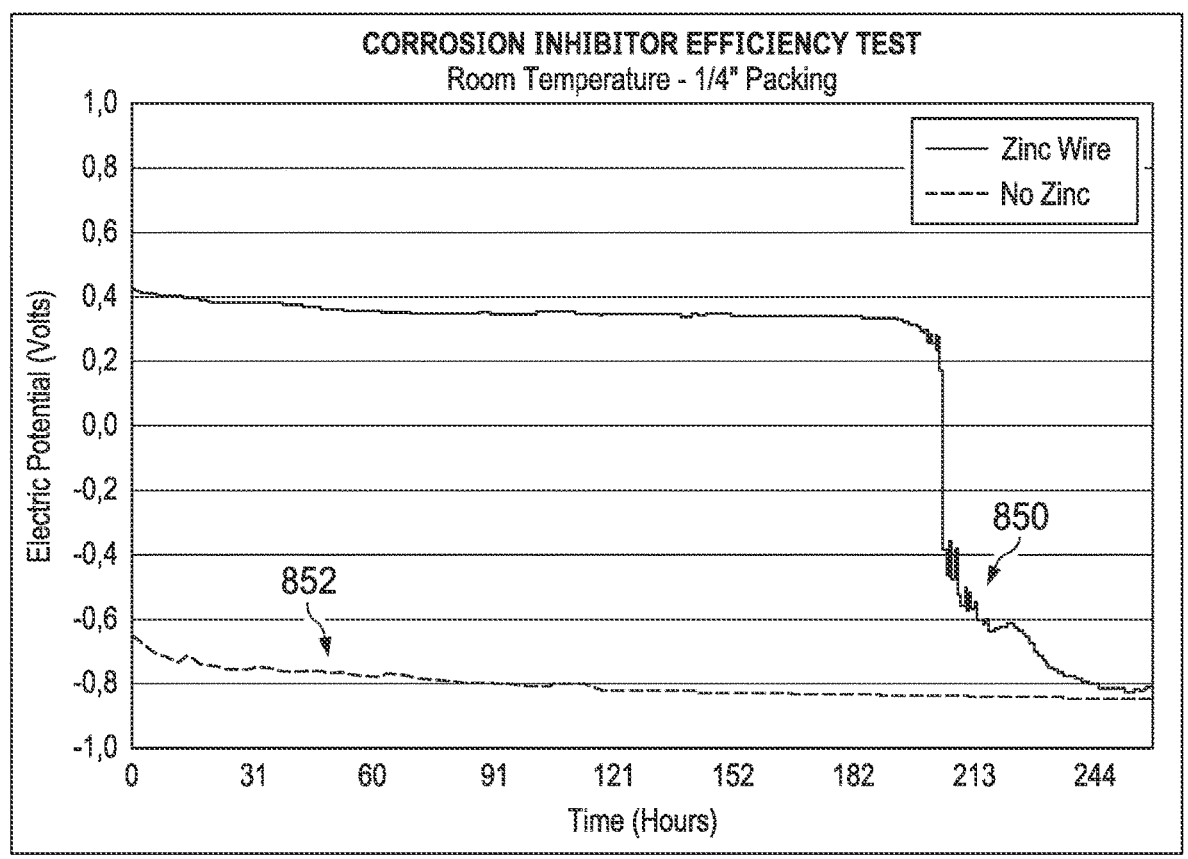
FIG. 15 illustrates comparative results of the efficiency of corrosion inhibitors when used in conjunction with the tracer particles.

Laboratory tests were developed to evaluate the efficiency of galvanic corrosion inhibitors, to determine if they would retain their original functionality with the tracer particles. For this test, an embodiment of the present disclosure with zinc wires as a corrosion inhibitor was compared to another embodiment without the zinc wires or any other type of corrosion inhibitor. As shown schematically in FIG. 14, the tests were conducted with a galvanic cell 840 where the compression packing 842 and a stainless-steel bar 844 act as electrodes. They were both immersed in an electrolyte solution 846 and were connected to a voltmeter 848 that recorded the electric potential difference between the packing 842 and the stainless-steel bar 844. The expected behavior of a working corrosion inhibitor, that is, protecting a valve stem from corrosion, is indicated by electrons moving from the packing 842 towards the stainless-steel bar 844. The direction of the flow of electrons can be determined by the voltage sign. As shown in FIG. 15, this test indicated that zinc wires were able to offer protection 850 as expected. Eventually, the zinc was consumed, which determines the point at which corrosion of the valve stem would begin, and this can be seen by a change in the direction of the electron flow. This result contrasts with the embodiment without corrosion inhibitors 852, in which the voltage sign indicates corrosion from the start of the test. This indicates that the tracer particles 819 do not interfere with corrosion inhibitor functionality and that zinc wires will serve as a suitable corrosion inhibitor in embodiments of the compression packing according to the present disclosure. Those of ordinary skill in the art will recognize that other corrosion inhibitors such as passive corrosion inhibitors including phosphate, barium molybdate and sodium molybdate may also be used.

According to certain embodiments of the present disclosure, the packing may include a coating of a lubricating agent, a blocking agent or both. Such blocking and lubricating agents may include any number of agents well known to those of ordinary skill in the art, such as animal fats, vegetable oils, PTFE, petroleum or mineral lubricants, synthetic lubricants, silicones, chlorofluorocarbons, graphite, paraffin, mica, tungsten disulfide, molybdenum disulfide, or greases. For instance, a compression packing according to the present disclosure was impregnated with PTFE representing less than 5% of the packing total volume. This coating is not necessary but can be added to further reduce packing friction.

Laboratory tests were designed to evaluate packing friction on an off-the-shelf control valve. This test measured packing friction when subject to different assembly stresses, to account for a different range of applications. This test had the goal of comparing a compression packing according the construction shown in FIG. 10, namely, a compression packing that was made of a flexible graphite tape reinforced with a PTFE filament with tracer particles in a knitted jacket configuration to a prior art compression packing made of a flexible graphite tape reinforced with a nickel-chromium yarn in a knitted jacket configuration for two different applications. The first application is when both packings do not include a PTFE coating, and the second application is when both packings include the same type of PTFE coating.

Figure 16:
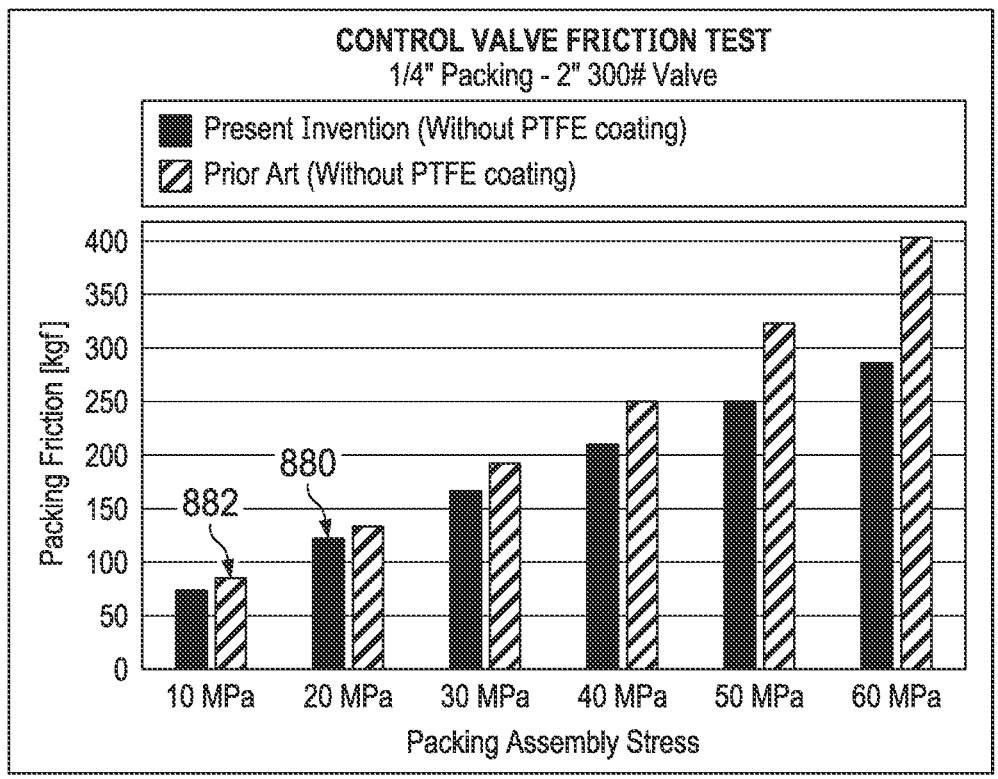
FIG. 16 illustrates the results of a control valve friction test, comparing an embodiment of the present disclosure with the current state-of-the-art, both without a PTFE coating.

FIG. 16 shows the results for the first application type, comparing the compression packing according to an embodiment 880 which had the construction shown in FIG. 10, namely, that the compression packing was made of a flexible graphite tape reinforced with a PTFE filament with tracer particles in a knitted jacket configuration and the prior art compression packing 882, which had a construction in which a flexible graphite tape was reinforced with a nickel-chromium yarn in a knitted jacket configuration, both without a PTFE coating. The results show that the compression packing according to the embodiment 880 had friction values, on average, 17% lower than the prior art compression packing 882.

Figure 17:
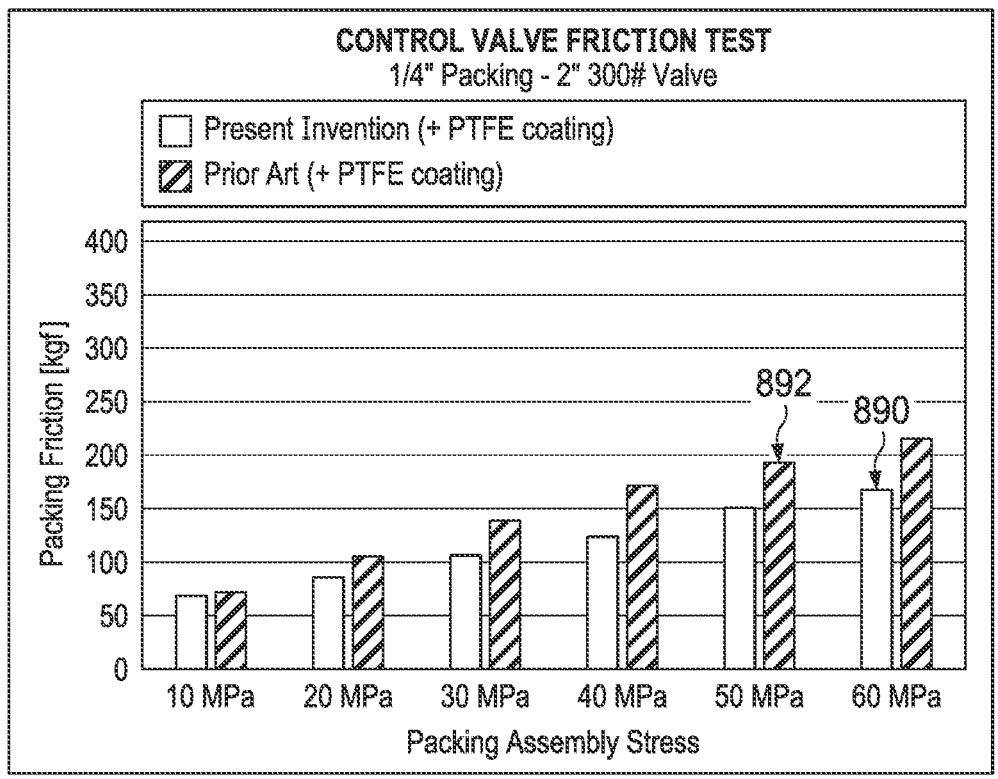
FIG. 17 illustrates the results of a control valve friction test, comparing an embodiment of the present disclosure with the current state-of-the-art, both with a PTFE coating.

FIG. 17 shows the results for the second application type, namely comparing the two packings discussed above but in which both packings had the same PTFE coating applied to them. The results show that the compression packing according to an embodiment 890 which had the construction shown in FIG. 11, namely, that the compression packing was made of a flexible graphite tape reinforced with a PTFE filament with tracer particles in a knitted jacket configuration had friction values, on average, 19% lower than the prior art compression packing 892, which had a construction in which a flexible graphite tape was reinforced with a nickel-chromium yarn in a knitted jacket configuration.

Figure 18:
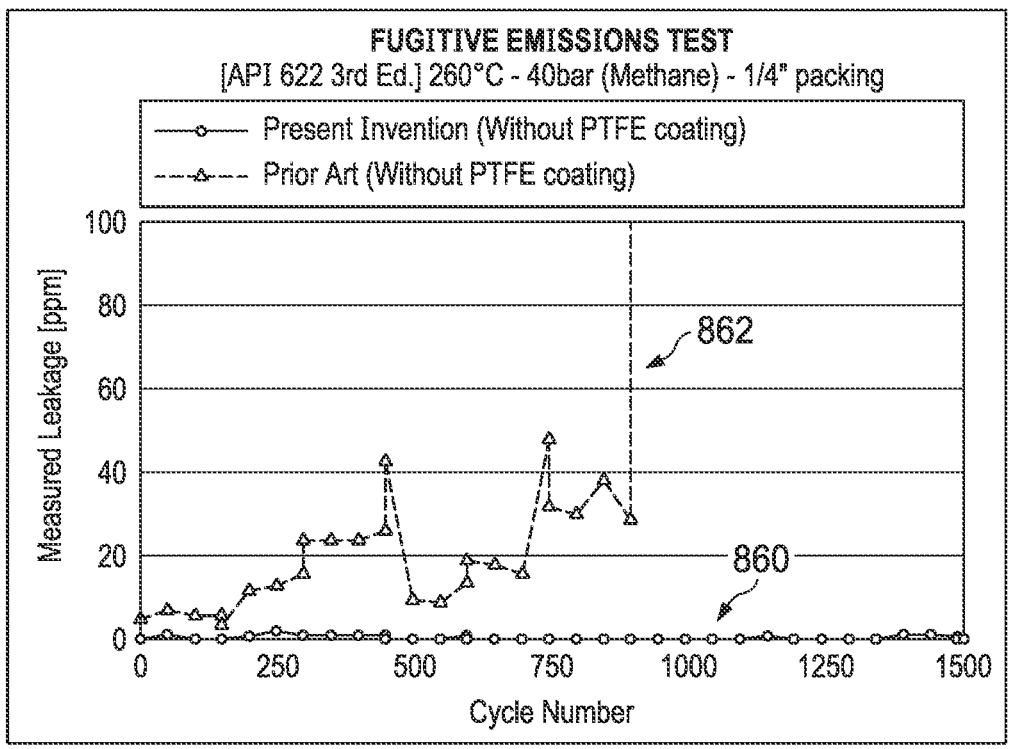
FIG. 18 illustrates the results of the API 622 fugitive emission test, comparing an embodiment of the present disclosure with the current state-of-the-art, both without a PTFE coating.

Laboratory tests were conducted following the procedure described in the fugitive emissions standard API 622. FIG. 18 shows the results for a compression packing according to an embodiment of the present disclosure 860, which had the construction shown in FIG. 11, namely, that the compression packing was made of a flexible graphite tape reinforced with a PTFE filament with tracer particles in a knitted jacket configuration, compared to a prior art compression packing 862, which had a construction which included flexible graphite tape reinforced with a nickel-chromium yarn in a knitted jacket configuration, both without a PTFE coating. The compression packing according to an embodiment of present disclosure 860 reached the approval criteria of the standard and had a lower leakage than the prior art compression packing 862. Furthermore, the prior art compression packing 862 failed the test at 950 mechanical cycles, when the measured leakage went above the allowable limit of 100 ppm.

Figure 19:
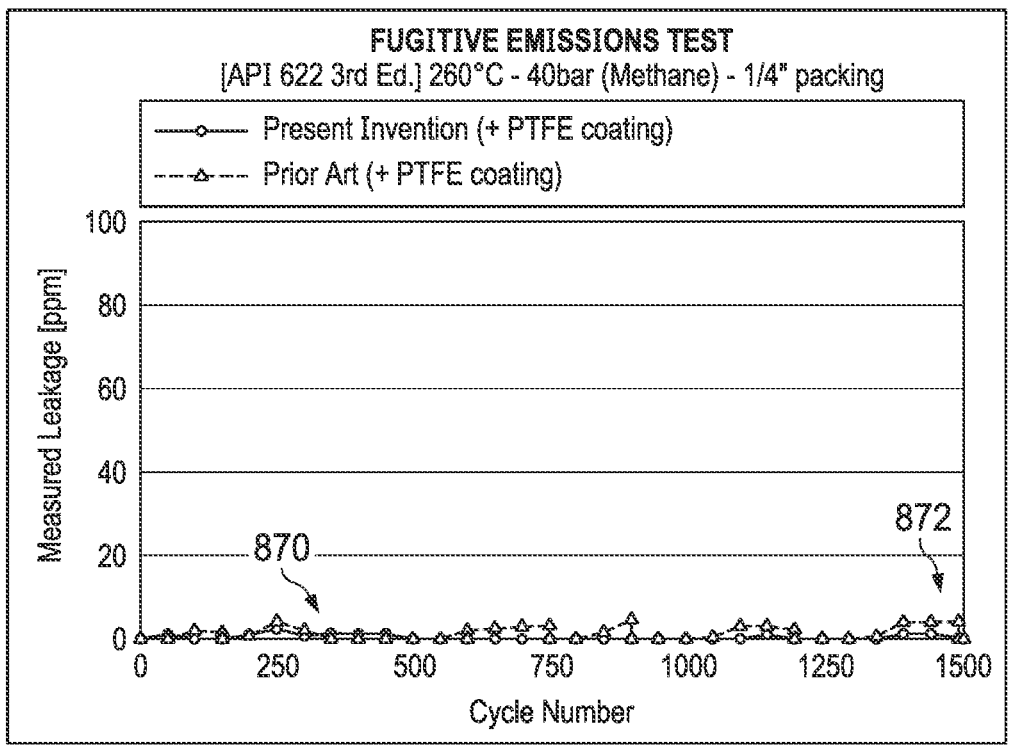
FIG. 19 illustrates the results of the API 622 fugitive emission test, comparing an embodiment of the present disclosure with the current state-of-the-art, both with a PTFE coating.

As shown in FIG. 19, further fugitive emissions testing according to API 622 was done comparing a compression packing according to an embodiment of the present disclosure 870, which had the construction shown in FIG. 11, namely, that the compression packing was made of a flexible graphite tape reinforced with a PTFE filament with the tracer particles in a knitted jacket configuration, and a prior art compression packing 872, which had a construction with included flexible graphite tape reinforced with a nickel-chromium yarn in a knitted jacket configuration, and in which both compression packings had a PTFE coating. Both packings reached approval criteria, and had similar performance, maintaining leakage well below the 100 ppm threshold. It is noted that for the prior art compression packing 872, a PTFE coating is necessary to stay under the 100 ppm threshold, whereas for the compression packing according to an embodiment of the present disclosure 870, a PTFE coating is not necessary to reduce leakage.

Figure 20:
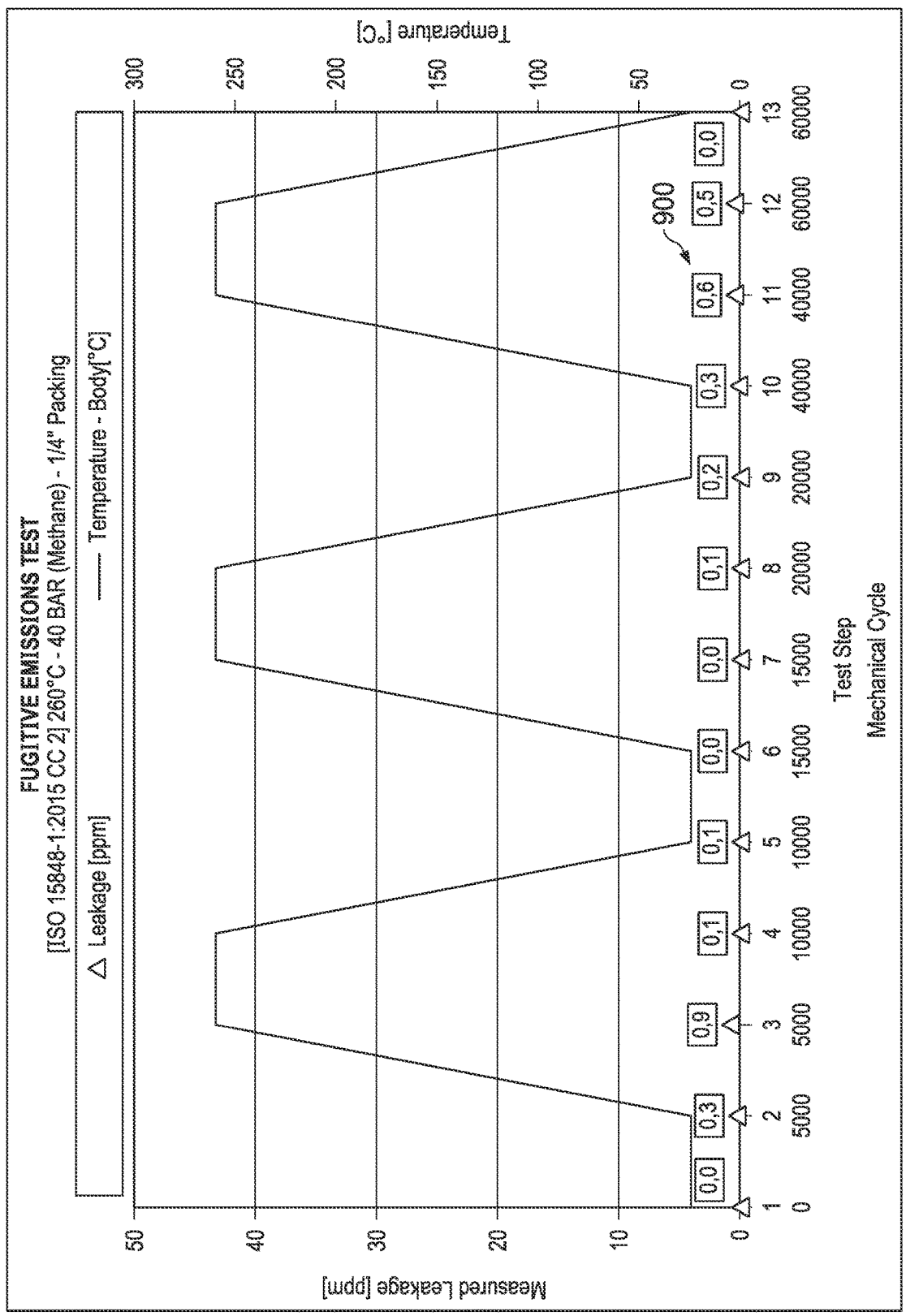
FIG. 20 illustrates the test results for the ISO 14848-1 fugitive emission test for an embodiment of the present disclosure.

Laboratory tests were conducted according to the fugitive emissions standard ISO 15848-1. For this test, an ASME B16.34 size 2 inches class 300 control valve was selected. The procedure followed endurance class CC2, which corresponds to 60,000 mechanical and 3 thermal cycles with the same temperature, pressure and test media described in API 622. The results are shown in FIG. 20, in which a compression packing according to embodiment 900 which had the construction shown in FIG. 11, namely, that the compression packing was made of a flexible graphite tape reinforced with a PTFE filament with tracer particles in a knitted jacket configuration, presented a leakage well below the 50 ppm required by the most restrictive tightness class in the standard, reaching approval criteria.

Laboratory fire tests were conducted simulating the standard API 607 Fire Safe. The tests were conducted in a rig that simulated the stuffing box of a 4" 300 #valve. The test rig was placed in an oven at 1000° C. and the temperature was monitored, when the temperature reached 650° C. the heat was turned off. The rig was then removed from the oven, cooled down to ambient temperature, and pressurized with water at 40 bar. Leakage was collected for 5 minutes in this phase, and the maximum allowable leak rate for a valve of this size was 600 ml/min. Tests were performed with a compression packing according to an embodiment which had the construction shown in FIG. 11, namely, that the compression packing was made of a flexible graphite tape reinforced with a PTFE filament with tracer particles in a knitted jacket configuration and presented a leakage below the allowable leak rate, reaching approval criteria.

Figure 21:
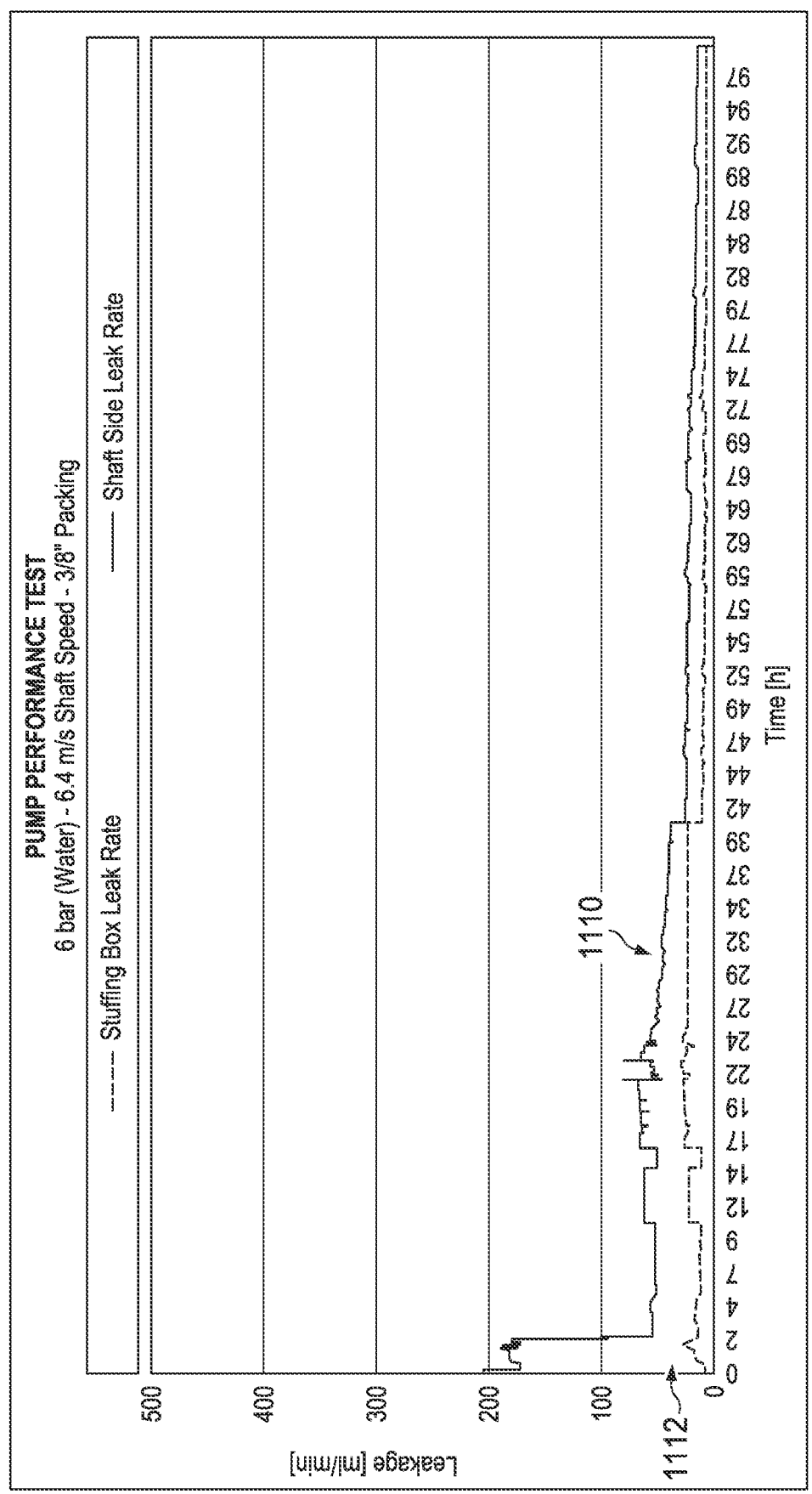
FIG. 21 illustrates the pump test results based on the standard EN 16752 for an embodiment of the present disclosure.

Compression packing according to an embodiment of the present disclosure was also tested in a pump application, which fundamentally differs from valve applications because the installation stresses are low and stem speed is significantly higher. For this, a test rig based on EN 16752: 2014 was used with a ⅜ inches packing cross-section size. The compression packing was subject to water pressurized at 6 bar for a total of 100 hours with a shaft speed of 1750 rpm (6.4 m/s). The test results are shown in FIG. 21, where fluid leakage was collected and measured separately for the shaft side 1110 and stuffing box side 1112. The tested compression packing embodiment of the present disclosure, had the construction shown in FIG. 11, namely, that the compression packing was made of a flexible graphite tape reinforced with a PTFE filament with tracer particles in a knitted jacket configuration with no PTFE coating. The compression packing had, on average, a leakage of 37 ml/min throughout the test. This is not a test applicable to the current fugitive emissions state-of-the-art metallic reinforced packings alternatives for valves since the high rotational speed coupled with the fact that pump shafts are usually softer than valve stems, would result in immediate damage to the equipment, and thus, creation of a leak path. This test result was unexpected and allows the packing to be a flexible sealing solution, being applicable not only for valves but also for pumps.

The above-described embodiments of the compression packing of the present disclosure were developed to enable fugitive emissions service and to resist high installation stresses without extruding and without the need for metallic reinforcements, a common practice in the industry. The lack of metallic reinforcements does not detract from the sealability performance, lowers operational friction as shown in FIG. 16 and FIG. 17 and eliminates the possibilities of stem and shaft damage or chipping. The above-described embodiments of the compression packing of the present disclosure carry tracer particles that enable the compression packing to retain information of its fabrication and can be used to trace the origins of the compression packing. The tracer particles are added directly to a PTFE filament during its fabrication. This PTFE filament can then be added to the compression packing in various forms and configurations. For instance, the PTFE filament with the tracer particles can be added as a single filament in the core of the compression packing exclusively for its tracking properties, whereas the rest of the compression packing is made with fugitive emissions compatible materials. The PTFE filament with the tracer particles can be twisted around a conventional flexible graphite tape, which gives the packing traceable properties and provides mechanical resistance to the flexible graphite tape which enables it to resist the destructive forces encountered in the braiding process. The PTFE filament with the tracer particles can be used in the form of a knitted mesh around a conventional flexible graphite tape, giving the compression packing traceable properties, extrusion resistance and provides mechanical resistance to the flexible graphite tape which enables it to be braided. The PTFE filament with the tracer particles can be used without the flexible graphite tape, similar to conventional PTFE packing but with additional traceable properties. Examples include using the PTFE filament with the tracer particles to entirely braid the packing or extruding the PTFE with the particles directly in the size of the stuffing box. The tracer particles are resistant to regular applications, such as abrasion, mechanical deformation, chemical attack, and elevated temperature, as shown by the multiple tests described above. Because of this, the tracer particles constitute a permanent identification method and therefore are much more reliable than the currently available forms of identification, since the tracer particles will not get lost or misplaced. This is particularly useful for end-users who need to ensure they are using a warrantied compression packing capable of meeting fugitive emissions requirements, such as users under consent decrees with the EPA for violation of the Clean Air Act. Furthermore, embodiments of the prevent disclosure meet the approval criteria of tests performed in a laboratory following the procedures of the API 622 and ISO 15848-1 fugitive emissions standards. As an additional application, since the compression packing of the present disclosure described above does not damage the shaft and has a soft exterior, it can be successfully used to control leakage in pump and dynamic applications, as shown on a laboratory test based on EN16752.

In some embodiments, contamination as described above comprises debris of a seal. Debris of a seal is any portion of the seal that has become detached from the seal.

Figure 22:
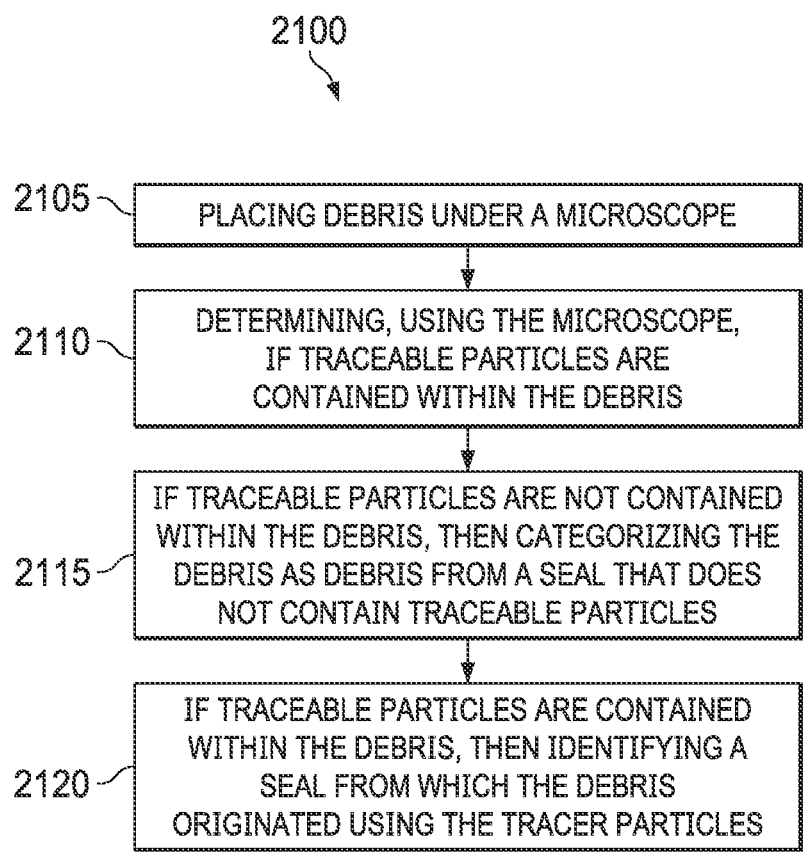
FIG. 22 is a flowchart of a method of identifying debris from a seal, according to an example embodiment.

FIG. 22 shows a method of categorizing or identifying debris from a seal and is generally referred to by the reference numeral 2100. Referring to FIG. 22, the method 2100 includes placing a piece of debris under a microscope at step 2105, determining, using the microscope, if traceable particles are contained within the piece of debris at step 2110, if traceable particles are not contained within the piece of debris, then categorizing the debris as debris from a seal that does not contain traceable particles at step 2115, if traceable particle are contained within the piece of debris, then identifying the seal from which the debris originated using the traceable particles at step 2120.

In some embodiments and at the step 2105, debris is placed under a microscope. The debris may be debris from a seal. In some embodiments and at step 2110, it is determined, using the microscope, if traceable particles are contained within the debris. In some embodiments, at step 2110, the microscope is equipped with a filter set for a particular fluorophore or fluorescent dyes of interest. Determining, using the microscope, if the debris includes traceable particles includes looking at the debris to determine whether traceable particles can be seen using the filter set. However, in some embodiments, step 2105 includes using a portable laser pen or an ultraviolet flashlight that results in excitation with traceable particles that are or include phosphors.

In some embodiments and at step 2115, if traceable particles are not contained within the piece of debris, then the debris is categorized as debris from a seal that does not contain traceable particles. It is the absence of traceable particles that indicates that the debris is not debris from a seal that has traceable particles. This is helpful to narrow down the type of seal that is the source of the debris.

In some embodiments and at step 2120, if traceable particles are contained within the piece of debris, then a seal from which the debris originated is identified. In some embodiments, the traceable particles include a pattern of microdots and the pattern is identified in step 2120. The identified pattern is then used to identify an origination or other identification data for the seal that created the debris.

The method 2100 may identify the composite gasket 300, the composite gasket 400, the compression packing 810, or the PTFE filament with tracer particles 822 described above as the source of the debris but also may confirm that the composite gasket 300, the composite gasket 400, the compression packing 810, and the PTFE filament with tracer particles 822 described above are not the source of the debris.

It is understood that variations may be made in the foregoing without departing from the scope of the disclosure.

The present disclosure discloses a traceable composite gasket material that includes a sintered polytetrafluoroethylene (PTFE) matrix; metallic powder; and traceable particles, wherein the metallic powder and the traceable particles are dispersed within the PTFE matrix. In some embodiments, the metallic powder responds to magnetic fields and to light with a detectable behavior. In some embodiments, the traceable particles are selected from fluorophores and fluorescent dyes. In some embodiments, the traceable particles absorb light and emit light at a specific wavelength that is visible under a microscope with a filter set for the traceable particles. In some embodiments, the traceable particles are phosphor particles. In some embodiments, the phosphor particles absorb light in a wavelength range that is invisible and emit light in the visible range. In some embodiments, the traceable particles include porous silicon particles. In some embodiments, the porous silicon traceable particles have nanopores visible in white light. In some embodiments, the traceable particles include microdot particles. In some embodiments, the microdot particles are visible under a microscope. In some embodiments, the material also includes any number of fillers. In some embodiments, the fillers include any one or more of barite, silica, natural hollow glass micro-spheres, and synthetic hollow glass micro-spheres. In some embodiments, the PTFE matrix includes fine powder PTFE. In some embodiments, the gasket material has a total weight; and the amount of PTFE is greater than 30% of the total weight of the gasket material. In some embodiments, the gasket material has a total weight; and the amount of metallic powder is from about 1% to about 70% of the total weight of the gasket material. In some embodiments, the gasket material has a total weight; and the amount of traceable particles is less than 5% of the total weight of the gasket material.

The present disclosure also discloses a method of identifying debris that includes placing debris under a microscope; determining, using the microscope, if traceable particles are contained within the debris; if traceable particles are not contained within the debris, then categorizing the debris as debris that does not contain traceable particles; if tracer particles are contained within the debris, then identifying a seal from which the debris originated using the tracer particles. In some embodiments, the seal is a gasket. In some embodiments, the seal is a compression packing.

In several example embodiments, the elements and teachings of the various illustrative example embodiments may be combined in whole or in part in some or all of the illustrative example embodiments. In addition, one or more of the elements and teachings of the various illustrative example embodiments may be omitted, at least in part, and/or combined, at least in part, with one or more of the other elements and teachings of the various illustrative embodiments.

Any spatial references such as, for example, "upper," "lower," "above," "below," "between," "bottom," "vertical," "horizontal," "angular," "upwards," "downwards," "side-to-side," "left-to-right," "left," "right," "right-to-left," "top-to-bottom," "bottom-to-top," "top," "bottom," "bottom-up," "top-down," etc., are for the purpose of illustration only and do not limit the specific orientation or location of the structure described above.

In several example embodiments, while different steps, processes, and procedures are described as appearing as distinct acts, one or more of the steps, one or more of the processes, and/or one or more of the procedures may also be performed in different orders, simultaneously and/or sequentially. In several example embodiments, the steps, processes and/or procedures may be merged into one or more steps, processes and/or procedures. In several example embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several example embodiments have been described in detail above, the embodiments described are example only and are not limiting, and those of ordinary skill in the art will readily appreciate that many other modifications, changes and/or substitutions are possible in the example embodiments without materially departing from the novel teachings and advantages of the present disclosure. Accordingly, all such modifications, changes and/or substitutions are intended to be included within the scope of this disclosure as defined in the following claims. In the claims, any means-plus-function clauses are intended to cover the structures described herein as performing the recited function and not only structural equivalents, but also equivalent structures.

What is claimed is:

1. A traceable composite gasket material comprising:
   a. a sintered polytetrafluoroethylene (PTFE) matrix;
   b. metallic powder; and
   c. traceable particles,
   d. wherein the metallic powder and the traceable particles are dispersed within the PTFE matrix.

2. The traceable composite gasket material of claim 1, wherein the metallic powder responds to magnetic fields and to light with a detectable behavior.

3. The traceable composite gasket material of claim 1, wherein the traceable particles are selected from fluorophores and fluorescent dyes.

4. The traceable composite gasket material of claim 3, wherein the traceable particles absorb light and emit light at a specific wavelength that is visible under a microscope with a filter set for the traceable particles.

5. The traceable composite gasket material of claim 1, wherein the traceable particles are phosphor particles.

6. The traceable composite gasket material of claim 5, wherein the phosphor particles absorb light in a wavelength range that is invisible and emit light in the visible range.

7. The traceable composite gasket material of claim 1, wherein the traceable particles comprise porous silicon particles.

8. The traceable composite gasket material of claim 7, wherein the porous silicon traceable particles have nanopores visible in white light.

9. The traceable composite gasket material of claim 1, wherein the traceable particles comprise microdot particles.

10. The traceable composite gasket material of claim 9, wherein the microdot particles are visible under a microscope.

11. The traceable composite gasket material of claim 1, further comprising any number of fillers.

12. The traceable composite gasket material of claim 11, wherein the fillers comprise any one or more of barite, silica, natural hollow glass micro-sphere, and synthetic hollow glass micro-sphere.

13. The traceable composite gasket material of claim 1, wherein the PTFE matrix comprises fine powder PTFE.

14. The traceable composite gasket material of claim 1,
   a. wherein the gasket material has a total weight; and
   b. wherein the amount of PTFE is greater than about 30% of the total weight of the gasket material.

15. The traceable composite gasket material of claim 1,
   a. wherein the gasket material has a total weight; and
   b. wherein the amount of metallic powder is from about 1% to about 70% of the total weight of the gasket material.

16. The traceable composite gasket sheet of claim 1,
   a. wherein the gasket material has a total weight; and
   b. wherein the amount of traceable particles is less than 5% of the total weight of the gasket material.

* * * * *